(12) United States Patent
Chabrol et al.

(10) Patent No.: US 10,647,793 B2
(45) Date of Patent: May 12, 2020

(54) USE OF A SULPHUR OR PHOSPHOROUS-CONTAINING POLYMER AS A PROCESSING AID IN A POLYVINYL CHLORIDE POLYMER COMPOSITION

(71) Applicant: Synthomer (UK) Limited, Harlow (GB)

(72) Inventors: Virginie Chabrol, Harlow (GB); Chris May, Harlow (GB); Peter Shaw, Harlow (GB)

(73) Assignee: Synthomer (UK) Limited, Harlow, Essex (GB)

( * ) Notice: Subject to any disclaimer, the term of this patent is extended or adjusted under 35 U.S.C. 154(b) by 0 days.

(21) Appl. No.: 15/914,427

(22) Filed: Mar. 7, 2018

(65) Prior Publication Data

US 2018/0194882 A1    Jul. 12, 2018

Related U.S. Application Data

(63) Continuation-in-part of application No. PCT/GB2016/052770, filed on Sep. 8, 2016, and a
(Continued)

(30) Foreign Application Priority Data

| Mar. 28, 2014 | (GB) | ................................... 1405627.9 |
| Dec. 3, 2014 | (GB) | ................................... 1421467.0 |
| Sep. 11, 2015 | (GB) | ................................... 1516125.0 |

(51) Int. Cl.
    *C08F 114/06*     (2006.01)
    *C08F 218/08*     (2006.01)
(Continued)

(52) U.S. Cl.
    CPC ............ *C08F 114/06* (2013.01); *C08F 14/06* (2013.01); *C08F 218/08* (2013.01);
(Continued)

(58) Field of Classification Search
    CPC ............ C08F 220/14; C08F 2220/1825; C08F 2220/585; C08F 218/08; C08F 14/06;
(Continued)

(56) References Cited

U.S. PATENT DOCUMENTS

| 2,300,920 A | 11/1942 | Heuer |
| 2,704,753 A | 3/1955 | Monaghan |

(Continued)

FOREIGN PATENT DOCUMENTS

| CN | 1323839 A | 11/2001 |
| CN | 1639209 A | 7/2005 |

(Continued)

OTHER PUBLICATIONS

Sherman, "Organic PVC Stabilizers Move from Europe to U.S.", Plastics Technology, 2005, pp. 1-3, https://www.ptonline.com/articles/organic-pvc-stabilizers-move-from-europe-to-us.
(Continued)

*Primary Examiner* — William K Cheung
(74) *Attorney, Agent, or Firm* — The Webb Law Firm

(57) ABSTRACT

The present invention relates to use of a sulphur or phosphorous-containing polymer as a processing aid in a polyvinyl chloride polymer composition.

25 Claims, 1 Drawing Sheet

Related U.S. Application Data continuation-in-part of application No. 15/129,736, filed as application No. PCT/GB2015/050939 on Mar. 27, 2015, now Pat. No. 10,106,635.

(51) Int. Cl.
*C08F 220/18* (2006.01)
*C08F 220/14* (2006.01)
*C08L 27/06* (2006.01)
*C08F 14/06* (2006.01)

(52) U.S. Cl.
CPC .......... *C08F 220/14* (2013.01); *C08F 220/18* (2013.01); *C08L 27/06* (2013.01); *C08F 2220/1808* (2013.01); *C08F 2220/1825* (2013.01)

(58) Field of Classification Search
CPC .... C08F 2/20; C08F 2220/1808; C08L 27/06; C08L 33/14
USPC ........................................................ 526/201
See application file for complete search history.

(56) References Cited

U.S. PATENT DOCUMENTS

| | | | |
|---|---|---|---|
| 2,834,759 A | 5/1958 | Austin | |
| 2,859,191 A | 11/1958 | Turnbull | |
| 3,206,424 A | 9/1965 | Heinrich et al. | |
| 3,219,608 A | 11/1965 | Ingleby et al. | |
| 3,265,654 A | 8/1966 | Glabisch et al. | |
| 3,320,199 A | 5/1967 | Brezinski et al. | |
| 3,501,432 A | 3/1970 | Wright et al. | |
| 3,925,290 A | 12/1975 | Matsuo et al. | |
| 3,959,205 A | 5/1976 | Kobayashi et al. | |
| 3,962,398 A | 6/1976 | Matsuo et al. | |
| 3,996,181 A | 12/1976 | Hayashi et al. | |
| 4,051,093 A | 9/1977 | Wendel et al. | |
| 4,316,976 A | 2/1982 | Wingrave | |
| 4,319,012 A | 3/1982 | Morningstar | |
| 4,324,878 A | 4/1982 | Biaggi et al. | |
| 4,388,442 A | 6/1983 | Taniguchi et al. | |
| 4,469,839 A | 9/1984 | Maruhashi et al. | |
| 4,536,548 A | 8/1985 | Stutzel | |
| 4,581,414 A | 4/1986 | Stutzel et al. | |
| 4,645,812 A | 2/1987 | Maier | |
| 4,798,869 A | 1/1989 | Sturm et al. | |
| 4,812,510 A | 3/1989 | Barnett et al. | |
| 5,268,412 A | 12/1993 | Raynolds | |
| 5,308,911 A * | 5/1994 | Takada ................. | C08F 2/20 524/35 |
| 5,331,055 A | 7/1994 | Fujiwara et al. | |
| 5,349,008 A | 9/1994 | Takada et al. | |
| 5,422,176 A | 6/1995 | Schuler et al. | |
| 5,439,008 A | 8/1995 | Bowman | |
| 5,484,840 A | 1/1996 | Binkley | |
| 5,629,378 A | 5/1997 | Takada | |
| 5,635,566 A | 6/1997 | Gerharz et al. | |
| 5,717,044 A | 2/1998 | Takada | |
| 5,753,774 A | 5/1998 | Chang | |
| 5,922,410 A | 7/1999 | Swartz et al. | |
| 5,962,580 A | 10/1999 | Nkansah et al. | |
| 5,973,029 A | 10/1999 | Hsu et al. | |
| 6,818,709 B1 | 11/2004 | Vicari | |
| 6,818,719 B2 | 11/2004 | Fujisawa et al. | |
| 6,833,409 B2 | 12/2004 | Nakamura et al. | |
| 7,022,656 B2 | 4/2006 | Verrall et al. | |
| 7,642,226 B2 | 1/2010 | Verrall et al. | |
| 7,745,553 B2 | 6/2010 | Such et al. | |
| 7,745,556 B2 | 6/2010 | Ferguson et al. | |
| 7,786,229 B2 | 8/2010 | Vicari | |
| 7,790,815 B2 | 9/2010 | Vicari | |
| 7,875,359 B2 | 1/2011 | Rodrigues et al. | |
| 7,932,328 B2 | 4/2011 | Vicari | |
| 7,994,265 B2 | 8/2011 | Vicari | |
| 8,062,758 B2 | 11/2011 | Rodrigues et al. | |
| 8,354,172 B2 | 1/2013 | Rodrigues | |
| 8,466,243 B2 | 6/2013 | Vicari | |
| 8,524,831 B2 | 9/2013 | Kato et al. | |
| 8,603,730 B2 | 12/2013 | Knocke | |
| 2001/0056150 A1 | 12/2001 | Smith et al. | |
| 2003/0073778 A1 | 4/2003 | Zhang et al. | |
| 2003/0105197 A1 | 6/2003 | Collins et al. | |
| 2003/0187103 A1 | 10/2003 | Bloom et al. | |
| 2004/0186034 A1 | 9/2004 | Verrall et al. | |
| 2005/0119419 A1 | 6/2005 | Blanchard et al. | |
| 2006/0148668 A1 | 7/2006 | Verrall et al. | |
| 2007/0184732 A1 | 8/2007 | Lunsford et al. | |
| 2007/0232771 A1 | 10/2007 | Choi et al. | |
| 2009/0137744 A1 | 5/2009 | Ferguson et al. | |
| 2009/0258953 A1 | 10/2009 | Dobrawa et al. | |
| 2009/0270543 A1 | 10/2009 | Mongoin et al. | |
| 2010/0069552 A1 | 3/2010 | Guerret et al. | |
| 2010/0227179 A1 | 9/2010 | Pfeiffer et al. | |
| 2010/0227975 A1 | 9/2010 | Such et al. | |
| 2011/0288229 A1 | 11/2011 | Vicari | |
| 2011/0313105 A1 | 12/2011 | Kato et al. | |
| 2012/0234490 A1 | 9/2012 | Daniels et al. | |
| 2013/0102702 A1 | 4/2013 | Hain et al. | |

FOREIGN PATENT DOCUMENTS

| | | |
|---|---|---|
| CN | 101133087 A | 2/2008 |
| CN | 101402705 A | 4/2009 |
| CN | 101528866 A | 9/2009 |
| CN | 102311516 A | 1/2012 |
| CN | 102898750 A | 1/2013 |
| CN | 103183774 A | 7/2013 |
| CN | 103193922 A | 7/2013 |
| CN | 103233364 A | 8/2013 |
| DE | 3513046 A1 | 10/1986 |
| EP | 0124700 A1 | 11/1984 |
| EP | 0222127 A2 | 5/1987 |
| EP | 0560264 A1 | 9/1993 |
| EP | 0655464 A2 | 5/1995 |
| EP | 0722813 A2 | 7/1996 |
| EP | 0747456 A2 | 12/1996 |
| EP | 1153936 A2 | 11/2001 |
| EP | 0847405 B1 | 10/2002 |
| EP | 1275693 A1 | 1/2003 |
| EP | 1463765 A4 | 5/2006 |
| EP | 1881998 A4 | 6/2009 |
| EP | 2415789 A1 | 2/2012 |
| GB | 886984 A | 1/1962 |
| GB | 399029 A | 6/1962 |
| GB | 337332 A | 9/1963 |
| GB | 380990 A | 1/1965 |
| GB | 1009109 A | 11/1965 |
| GB | 1056447 A | 1/1967 |
| GB | 1247068 A | 9/1971 |
| GB | 1254186 A | 11/1971 |
| GB | 1350282 A | 4/1974 |
| GB | 1438449 A | 6/1976 |
| GB | 1482058 A | 8/1977 |
| JP | 5424989 A | 2/1979 |
| JP | 54112985 A | 9/1979 |
| JP | 55137105 A | 10/1980 |
| JP | 56167745 A | 12/1981 |
| JP | 58131902 A | 8/1983 |
| JP | 6366204 A | 3/1988 |
| JP | 63270535 A | 11/1988 |
| JP | 195103 A | 4/1989 |
| JP | 4227904 A | 8/1992 |
| JP | 8120008 A | 5/1996 |
| JP | 2004269877 A | 9/2004 |
| JP | 2007291215 A | 11/2007 |
| RU | 2010154355 A | 7/2012 |
| TW | 201211087 A | 3/2012 |
| TW | I412540 B | 10/2013 |
| TW | 201400510 A | 1/2014 |
| TW | 201400511 A | 1/2014 |
| WO | 9209657 A1 | 6/1992 |
| WO | 9708212 A1 | 3/1997 |
| WO | 9825976 A2 | 6/1998 |

(56) References Cited

FOREIGN PATENT DOCUMENTS

| WO | 03055919 A1 | 7/2003 |
|---|---|---|
| WO | 2006064226 A1 | 6/2006 |
| WO | 2007057344 A1 | 5/2007 |
| WO | 2007111403 A1 | 10/2007 |
| WO | 2007141182 A2 | 12/2007 |
| WO | 2012007356 A1 | 1/2012 |
| WO | 2015145174 A1 | 10/2015 |

OTHER PUBLICATIONS

Slomkowski et al, "Terminology of polymers and polymerization processes in dispersed systems (IUPAC Recommendations 2011)", Pure Appl. Chem., 2011, pp. 2229-2259, vol. 83:12.
Allsopp, "Morphology of PVC", Manufacture and Processing of PVC, Chapter 7, 1982, pp. 151-182.
Amalvy et al., "Reactive Surfactants in Heterophase Polymerization. 11. Particle Nucleation", Macromolecules, 1998, pp. 5631-5638, vol. 31.
Burgess, "Suspension Polymerisation of Vinyl Chloride", Manufacture and Processing of PVC, Chapter 1, 1982, pp. 1-20.
Clark, "Particle Formation", Particulate Nature of PVC, Chapter 1, 1982, pp. 1-26.
Maruyama et al., "New Modifications of Poly(vinyl alcohol)s and Their Applications", British Polymer Journal, 1988, pp. 345-351, vol. 20.
Kinetics and Mechanisms of Polymerization, Chapter 1-12, Marcel Dekker Inc., 1967, pp. 1-7, vol. 1 :1.
Kinetics and Mechanisms of Polymerization, Chapter 4-1, Tables 4-1 and 4-2, Marcel Dekker Inc., 1967, pp. 1-3, vol. 1 :1.
Ormondroyd, "The Influence of Poly(vinyl alcohol) Suspending Agents on Suspension Poly(vinyl chloride) Morphology", British Polymer Journal, 1987, pp. 1-12.
Prince, "Waler dilutable secondary stabilisers in suspension polymerisation of vinyl chloride monomer", Plastics, Rubber and Composites, 1999, pp. 105-108, vol. 28:3.
Schoonbrood et al., "Reactive Surfactants in Heterophase Polymerization. 9. Optimum Surfmer Behavior in Emulsion Polymerization", Macromolecules, 1997, pp. 6034-6041, vol. 30.
Shaw et al., "A PVC Pilot plant and its role in customer support, and the development of novel polyvinyl alcohols.", Proceedings of PVC 2011, Brighton, UK, pp. 499-511, Apr. 9, 2019.
Visentini et al , "A Study Into the Mechanism of Grafting of Suspending Agents in PVC Polymerisation", Proceedings of PVC, 2011, Brighton, UK, pp. 1-4.
Allsopp, "Mechanism of Gelation of Rigid PVC", Manufacture and Processing of PVC, Chapter 8, 1982, pp. 183-213 Applied Science, London.
Allsopp et al.,"Poly(Vinyl Chloride)", Ullmann's Encyclopedia of Industrial Chemistry, 1992, vol. A21, pp. 717-742, VCH verlagsgesellschaft mbH, Weinheim.
Crompton, "Organic based heat stabilizers for rigid PVC", Plastics Additives & Compounding, Nov. 2001, pp. 26-30, vol. 3:11.
Jennings et al., "PVC Stabilizers and Lubricants", PVC Handbook, Chapter 4, 2005, pp. 95-171, Hanser, Munich.
Lindemann, "The mechanism of Vinyl Acetate Polymerization", Kinetics and Mechanisms of Polymerization, 1967, vol. 1, pp. 217-242, Edward Arnold LTD., London.
Matthews, "Other aspects of formulation", VC: production, properties and uses, Chapter 7, 1996, pp. 119-140, vol. 587, Institute of Materials, London.
Matthews, "Properties of vinyl chloride polymers and copolymers", PVC: production, properties and uses, Chapter 1, 1996, pp. 41-62, vol. 587, Institute of Materials, London.
Titow, "Plasticisers", Developments in PVC production and processing, Chapter 4.2, 1977, pp. 64-65, Whelan and Croft.

\* cited by examiner

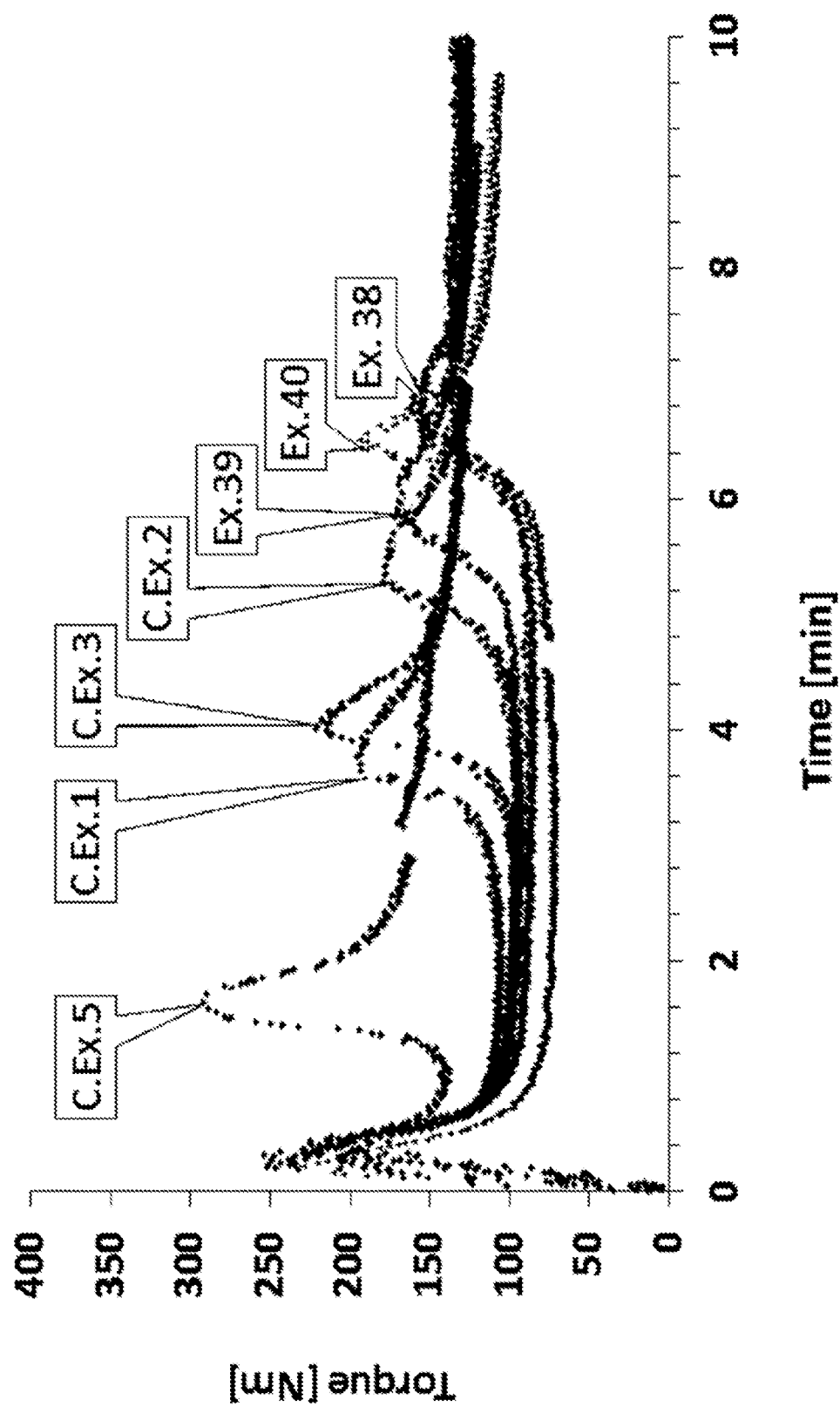

USE OF A SULPHUR OR PHOSPHOROUS-CONTAINING POLYMER AS A PROCESSING AID IN A POLYVINYL CHLORIDE POLYMER COMPOSITION

CROSS-REFERENCE TO RELATED APPLICATIONS

This application claims priority to International Application Number PCT/GB2016/052770 filed on Sep. 8, 2016; which claims priority to Great Britain Patent Application Number GB 1516125.0 filed on Sep. 11, 2015. This application is also a continuation-in-part application of U.S. patent application Ser. No. 15/129,736 filed on Sep. 27, 2016, now issued as U.S. patent Ser. No. 10/106,635, which claims priority to International Application Number PCT/GB2015/050939, which was filed Mar. 27, 2015, which claims priority to Great Britain Patent Application Number 1516125.0, which was filed Sep. 11, 2015, Great Britain Patent Application Number 1405627.9, which was filed on Mar. 28, 2014, and Great Britain Patent Application Number GB 1421467.0 filed on Dec. 3, 2014. All of these application are incorporated by reference in their entirety.

BACKGROUND OF THE INVENTION

The present disclosure relates to use of a polymer as a processing additive in a polyvinyl chloride polymer composition.

The present invention concerns polyvinyl chloride and polyvinyl chloride processing. More particularly, but not exclusively, this invention relates to use of a polymer as a processing aid in a polyvinyl chloride polymer composition. The invention also concerns a method of processing a polyvinyl chloride polymer composition, a composition for synthesising a polyvinyl chloride polymer, a processing aid, a method of making a polyvinyl chloride composition and a polyvinyl chloride polymer composition.

Polyvinyl chloride (often known as PVC) is well known to those skilled in the art. It is a versatile and relatively inexpensive polymer to which may be added many additives in order to obtain the desired properties for processing and for the polymer once processed. Melt processing additives are one type of additive which is well known to those skilled in the art. These melt additives are typically in the form dry powders or polymers. Powders are typically added to the PVC polymer and dry blended using a blender. This requires a separate operation, furthermore it requires additional energy and it has the potential to create dust and high shear blending may impart unwanted thermal history into the grains of polyvinyl chloride polymer. Furthermore, dry powder additives require that an emulsion polymer is first produced in aqueous solution, and then it must be coagulated (and comminuted) or spray dried. It is well known that spray drying of emulsion polymers is an energy intensive process, and further complicated by the desire to produce agglomerated versions to prevent dust evolution and dust explosions. Indeed, in the case of acrylic and butadiene based emulsions the spray drying must be carried out under "low oxygen" or inert atmosphere conditions in order to mitigate against dust explosions.

Certain polymers may be used as a melt processing aid. The predominant chemistry used for melt processing aids is based upon copolymers of methyl (meth)acrylate and a low level (typically 10-20 wt %) of ethyl acrylate. Typical usage levels for processing aids are 0-2 phr (parts per hundred of PVC polymer), but can increase to 5-8 phr in rigid foam extrusion compounds. Such acrylic processing aids typically lead to an unwanted increase in viscosity, as shown by an increased fusion torque using a torque rheometer.

The present invention seeks to mitigate one or more of the above-mentioned problems. Alternatively or additionally, the present invention seeks to provide an improved processing aid, method of processing a polyvinyl chloride polymer composition and/or a polyvinyl chloride polymer composition.

SUMMARY OF THE INVENTION

In accordance with a first aspect of the present invention, there is provided use of a sulphur or phosphorous-containing polymer as a processing aid in a polyvinyl chloride polymer composition, the sulphur or phosphorous-containing polymer comprising:

(i) residues of at least one ester-containing monomer, the ester-containing monomer(s) comprising one polymerisable carbon-carbon double bond per monomer and an ester group, and (ii) one or more residues of:

(a) at least one monomer comprising a sulfonate, sulfonic acid, sulfonic ester, sulfonamide or sulfonyl halide group (or a salt or ester thereof), the monomer(s) comprising a sulfonate, sulfonic acid, sulfonic ester group, sulfonamide or sulfonyl halide group (or a salt or ester thereof) comprising one polymerisable carbon-carbon double bond per monomer and a sulfonate, sulfonic acid, sulfonic ester, sulfonamide or sulfonyl halide group (or a salt or ester thereof), or (b) at least one monomer of:

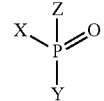

Formula (1)

where P is phosphorus, O is oxygen, at least one of X, Y and Z comprises at least one (and optionally only one) polymerisable carbon-carbon double bond, and at least one of X, Y and Z comprises —OH, or a salt or ester thereof, the sulphur or phosphorous-containing polymer optionally being partially hydrolysed such that a proportion of said ester groups form alcohol groups, the degree of hydrolysis of the polymer being from 0 to 60 mol %.

The applicants have surprisingly found that the sulphur or phosphorous-containing polymer provides enhanced melt processing and flow characteristics in a polyvinyl chloride polymer composition.

For the avoidance of doubt, the sulphur or phosphorus-containing polymer may comprise both sulphur and phosphorus, and may optionally comprise monomer residues (a) and (b) (referred to herein as "monomer (a)" and "monomer (b)" respectively), although typically said polymer would comprise residues of monomer (a), but no residues of monomer (b), or residues of monomer (b), but no residues of monomer (a).

For the avoidance of doubt, the term "processing aid" indicates that the sulphur or phosphorus-containing polymer aids processing of the polyvinyl chloride polymer composition i.e. processing of the polyvinyl chloride polymer composition once the polyvinyl chloride polymer has been synthesised i.e. post-synthesis of the polyvinyl chloride polymer. The processing aid may aid processing of solid polyvinyl chloride polymer. Furthermore, the term "aids processing" includes, but is not limited to, one or both of melt processing and acting as a flow modifier.

For the avoidance of doubt, a polyvinyl chloride polymer composition typically comprises a polyvinyl chloride polymer and one or more additives.

Those skilled in the art will realise that the term "polyvinyl chloride polymer" is not limited to a homopolymer of vinyl chloride. Those skilled in the art will realise that the term has a much broader meaning. Those skilled in the art will realise that "polyvinyl chloride polymer" may also be referred to as "poly(vinyl chloride) polymer". In this connection, "polyvinyl chloride polymer" includes (but is not limited to) polyvinyl chloride homopolymers, vinyl chloride copolymers, graft copolymers, and vinyl chloride polymers polymerized in the presence of others polymer, such as an HDT (heat distortion temperature) enhancing polymer, impact toughener, barrier polymer, chain transfer agent, stabilizer, plasticizer or flow modifier.

Suitable comonomers for vinyl chloride include acrylic and methacrylic acids; esters of acrylic and methacrylic acid, wherein the ester portion has from 1 to 12 carbon atoms, for example methyl, ethyl, butyl and ethylhexyl acrylates and the like; methyl, ethyl and butyl methacrylates and the like; hydroxyalkyl esters of acrylic and methacrylic acid, for example hydroxymethyl acrylate, hydroxyethyl acrylate, hydroxyethyl methacrylate and the like; glycidyl esters of acrylic and methacrylic acid, for example glycidyl acrylate, glycidyl methacrylate and the like; alpha, beta unsaturated dicarboxylic acids and their anhydrides, for example maleic acid, fumaric acid, itaconic acid and acid anhydrides of these, and the like; acrylamide and methacrylamide; acrylonitrile and methacrylonitrile; maleimides, for example, N-cyclohexyl maleimide; olefin, for example ethylene, propylene, isobutylene, hexene, and the like; vinylidene chloride, for example, vinylidene chloride; vinyl ester, for example vinyl acetate; vinyl ether, for example methyl vinyl ether, allyl glycidyl ether, n-butyl vinyl ether and the like; crosslinking monomers, for example diallyl phthalate, ethylene glycol dimethacrylate, methylene bis-acrylamide, tracrylyl triazine, divinyl ether, allyl silanes and the like; and including mixtures of any of the above comonomers. Those skilled in the art will realise that the nomenclature of some of the compounds mentioned above can be expressed in more than one way. For example those skilled in the art will realise that "methacrylate" is sometimes written "(meth) acrylate", and vice versa.

If the polyvinyl chloride polymer is a copolymer, the copolymer may typically comprise up to 60% by weight, typically up to 30% by weight, preferably up to 20% by weight, more preferably up to 17% by weight (based on total weight of monomers) of one or more comonomers.

"Polyvinyl chloride polymer" also includes chlorinated polyvinyl chloride (often called CPVC), wherein a polyvinyl chloride polymer is further reacted with chlorine radicals produced from chlorine gas dispersed in water and irradiated to generate chlorine radicals dissolved in water to produce CPVC, a polymer with a higher glass transition temperature ($T_g$) and heat distortion temperature. Commercial CPVC typically contains by weight from about 58% to about 70% and preferably from about 63% to about 68% chlorine.

The polyvinyl chloride polymer composition may contain effective amounts of additives ranging from 0.01 to about 500 weight parts per 100 weight parts of the polyvinyl chloride polymer. For example, various primary and/or secondary lubricants such as oxidized polyethylene, paraffin wax, fatty acids, and fatty esters and the like can be used.

Thermal and ultra-violet light (UV) stabilizers can be utilized such as various organo tins, for example dibutyl tin, dibutyltin-S—S'-bi-(isooctylmercaptoacetate), dibutyl tin dilaurate, dimethyl tin diisooctylthioglycolate, mixed metal stabilizers like barium zinc and calcium zinc, lead stabilizers (tri-basic lead sulfate, di-basic lead phthalate, for example), and organic stabilisers which do not contain heavy metals (http://www.sciencedirect.com/science/article/pii/ S1464391X01803032, http://www.ptonline.com/articles/organic-pvc-stabilizers-move-from-europe-to-us). Secondary stabilizers may be included for example a metal salt of phosphoric acid, polyols, and epoxidized oils. Specific examples of salts include water-soluble, alkali metal phosphates, disodium hydrogen phosphate, orthophosphates such as mono-, di-, and tri-orthophosphates of said alkali metals, alkali metal polyphosphates, -tetrapolyphosphates and -metaphosphates and the like. Polyols such as sugar alcohols, polyvinyl alcohols and epoxides such as epoxidized soybean oil can be used. Typical levels of secondary stabilizers range from about 0.1 wt. parts to about 10.0 wt. parts per 100 wt. parts of PVC (phr).

In addition, antioxidants such as phenolics, BPA (bisphenol A), BHT (butylated hydroxytoluene), BHA (butylated hydroxyanisole), various hindered phenols and various inhibitors like substituted benzophenones can be used.

Various processing aids, fillers, pigments, flame retardants and reinforcing materials can also be utilized in amounts up to about 200 or 300 phr. Exemplary processing aids are acrylic polymers such as poly methyl(meth)acrylate based materials.

Examples of fillers include calcium carbonate, clay, silica and various silicates, talc, carbon black and the like. Reinforcing materials include glass fibers, polymer fibers and cellulose fibers. Such fillers are generally added in amounts of from about 3 to about 500 phr of PVC. Preferably from 3 to 300 phr of filler are employed for extruded profiles such as louvers or cove base moldings. Also, flame retardant fillers like ATH (Aluminum trihydrates), AOM (ammonium octamolybdate), antimony trioxides, magnesium oxides and zinc borates are added to boost the flame retardancy of polyvinyl chloride. The concentrations of these fillers range from 1 phr to 200 phr.

Examples of various pigments include titanium dioxide, carbon black and the like. Mixtures of fillers, pigments and/or reinforcing materials also can be used.

The use as a processing aid may comprise use as a melt processing additive (otherwise known as a fusion additive, or a gelation additive, the terms being used interchangeably herein) and/or may comprise use as a flow modifier. Likewise, the terms "melt", "fusion" and "gelation" are used interchangeably throughout.

Use as a melt processing additive may provide improved melt processing/fusion characteristics (also known as gelation characteristics), such as suitable viscosity parameters (for example, suitable pre-melt/pre-fusion viscosity, suitable maximum viscosity during fusion and/or suitable viscosity of the melted polymer), suitable fusion/melting temperature, suitable bubbling behaviour during fusion/melting, suitable fusion/melt torque, suitable pre-fusion/pre-melt torque and suitable fusion time. The word "suitable" indicates that the particular characteristic is beneficial, and will often (but not always) indicate that the particular value is lower than that which would be obtained in the absence of the melt processing additive. In many cases, the melt processing additive may provide improved values for one or more of the above mentioned characteristics compared to that which would be obtained in the absence of the melt processing additive, and may provide values which are worse in relation to one or more of the above mentioned characteristics compared to that which would be obtained in the absence of the melt processing additive. The terms "fusion torque/melt torque", "pre-fusion torque/pre-melt torque" and "fusion time" refer to characteristics measured using a torque rheometer. "Fusion torque" indicates the torque value at a maximum in the torque-time curve associated with coalescence of particles during the fusion/melting process. Improved fusion torque will help the processing of PVC polymers; a high fusion torque corresponds to a high viscosity, meaning that the PVC polymer may be both difficult to process, and/or require more energy to process and/or may reduce the available capacity of the chosen melt processing equipment. "Pre-melt torque" indicates the torque before melting takes place and therefore is indicative of the viscosity of the unfused/unmelted polymer. An improved pre-melt torque indicates that unmelted polymer may provide suitable resistance to flow. This may be important because resistance to flow of unmelted polymer may be a key processing parameter, for example, when unmelted polymer is moved using an auger/screw conveyor. "Fusion time" is indicative of the time taken for a polymer to melt in a torque rheometer, for example.

Use as a flow modifier may provide desired or improved flow characteristics to a polyvinyl chloride polymer composition. Such flow characteristics may be those associated with the composition at low or high temperatures. For example, such flow characteristics may be those associated with the composition at temperatures lower than the melting point of the polyvinyl polymer i.e. associated with unmelted polymer, and/or may be associated with the melted polyvinyl polymer and/or associated with the polyvinyl polymer in a transition between the unmelted and melted state.

In the use of the present invention, the sulphur or phosphorous-containing polymer may further provide other functionality in addition to processing aid functionality. For example, the sulphur or phosphorous-containing polymer may act as a porosity control additive; this is the case, for example, if the sulphur or phosphorous-containing polymer is used as a secondary suspending agent.

In the use of the first aspect of the present invention, the sulphur or phosphorous-containing polymer may optionally be incorporated into the polyvinyl chloride polymer composition during and/or after the synthesis of the polyvinyl chloride polymer. In the present case, at least a portion of (optionally most of, and optionally all of) the sulphur or phosphorous-containing polymer is preferably present in the reaction mixture as the polyvinyl chloride polymer is synthesised. Optionally, at least a portion of the sulphur or phosphorous-containing polymer may be added to the polyvinyl chloride polymer composition after the polyvinyl chloride polymer is synthesised. The polyvinyl chloride polymer may be synthesised by any method known to those skilled in the art. The polyvinyl chloride polymer may be synthesised by suspension, solution, bulk or emulsion polymerisation.

The sulphur or phosphorous-containing polymer may be made by emulsion, solution or suspension polymerisation. Optionally, the sulphur or phosphorous-containing polymer may be made by emulsion polymerisation, and added to a suspension polymerisation reaction mixture comprising vinyl chloride. The polymer may be added as an emulsion. For the avoidance of doubt, it is hereby stated that the sulphur or phosphorous-containing polymer may be added as an emulsion, but the emulsion may or may not retain its emulsion character once added to a suspension polymerisation reaction mixture comprising vinyl chloride. The sulphur or phosphorous-containing polymer may be added to a suspension polymerisation reaction mixture comprising vinyl chloride as a homogenous solution in a solvent, for example, a mixture of water and methanol. Alternatively or additionally, dried particles of sulphur or phosphorous-containing polymer may be added to a suspension polymerisation reaction mixture comprising vinyl chloride, in which the dried particles may optionally disperse to form an emulsion. The dried particles of sulphur or phosphorous-containing polymer may optionally be formed by making the sulphur or phosphorous-containing polymer using emulsion polymerisation and then drying the emulsion, thereby forming what are often known as dried emulsions. Alternatively or additionally, the sulphur or phosphorous-containing polymer may be dispersed as an emulsion in a solvent optionally using a colloid, for example. The sulphur or phosphorous-containing polymer may alternatively be made by polymerisation in a dispersed media, or solution or bulk polymerisation.

If the sulphur or phosphorous-containing polymer is made by emulsion polymerisation, then optionally the sulphur or phosphorous-containing polymer optionally comprises a seed. Said seed may be located inside polymer particles or it may be incorporated into the particle or it may form part of the protective colloid/stabilising system of the particle. Optionally the sulphur or phosphorous-containing polymer may be made by emulsion polymerisation in the presence of a seed. The use of such seeds in emulsion polymerisation is known to those skilled in the art. Such seeds are used to control particle size and particle size distribution. Such seeds are typically provided in sufficient quantity so that substantially all polymer growth takes place at or around the seeds. The seed optionally comprises a seed polymer. The seed polymer need not be the same as the sulphur or phosphorous-containing polymer i.e. the seed polymer need not contain residues of an ester containing monomer and the sulphur-containing monomers mentioned above. The seed should be colloidally-stable in the emulsion used for the emulsion polymerisation. The seed may be pre-synthesised. Alternatively, the seed may be synthesised in situ. For example, the seed may be formed from one or both of the monomers (i) and (ii).

The sulphur or phosphorous-containing polymer may be substantially unhydrolysed.

The sulphur or phosphorous-containing polymer may comprise residues of more than one ester-containing monomer. For example, the sulphur or phosphorous-containing polymer may comprise residues of vinyl acetate and methyl methacrylate or vinyl acetate and dimethyl maleate or methyl methacrylate and butyl acrylate, or methyl methacrylate and ethyl methacrylate. Alternatively a combination of 3 or more monomers, for example, vinyl acetate, methyl methacrylate and butyl acrylate may be used.

Alternatively, the sulphur or phosphorous-containing compound may comprise residues of substantially only one ester-containing monomer, such as an alkenyl alkanoate, such as an alkenyl acetate, such as vinyl acetate. In this case, the term "substantially only one" may indicate that more than one ester-containing monomer may be present, but at very lower levels, such as less than 5 mol %, less than 2 mol % and optionally less than 1 mol % of the amount of the major ester-containing monomer.

The statements below in relation to the ester-containing monomer may apply to one or more monomers used to make the sulphur or phosphorous-containing polymer.

The ester-containing monomer optionally comprises a polymerisable C=C group attached to an ester group, optionally via a linker. In general, it is preferred that there is no linker group between the polymerisable C=C group and the ester group. The ester group may, for example, comprise an ester of an alkenoic acid, for example. The ester group may, for example, comprise an ester of an acrylic acid, for example, (meth)acrylic acid. The ester group may, for example, comprise an alkenyl alkanoate. Alternatively, the ester group may incorporate a linker group between the polymerisable C=C group and the ester group.

The ester group may be arranged with the —O— moiety adjacent to the C=C group (as in alkenyl alkanoates, such as vinyl acetate), or with the C=O moiety adjacent to the C=C group (as in alkyl acrylates, such as $C_1$ to $C_6$ alkyl acrylates, such as methyl acrylate, ethyl acrylate, butyl acrylate and methyl methacrylate).

The C=C group may optionally be substituted at one, two or three positions. For example, each substituent present may optionally be selected from one or more of halo, hydroxy or an optionally substituted $C_1$ to $C_6$ alkyl group.

The ester-containing monomer optionally comprises one or more of vinyl acetate, vinyl benzoate, vinyl 4-tert-butylbenzoate, vinyl chloroformate, vinyl cinnamate, vinyl decanoate, vinyl neononanoate, vinyl neodecanoate, vinyl pivalate, vinyl propionate, vinyl stearate, vinyl trifluoroacetate, vinyl valerate, methyl vinyl acetate, propenyl acetate, methyl propenyl acetate, ethyl propenyl acetate, butenyl acetate, methyl butenyl acetate, vinyl propanoate, propenyl propanoate, vinyl butyrate, vinyl hexanoate, vinyl heptanoate, vinyl octanoate, vinyl 2-propylheptanoate, vinyl nonanoate, vinyl neononanoate, vinyl trifluoroacetate. For example, one or more of the above-mentioned monomers may be a major monomer in that it provides more than 50 mol % of the ester-containing monomer content. Additionally or alternatively, one or more of the above-mentioned monomers may be a minor monomer in that it provides less than 50 mol % of the ester-containing monomer content.

The ester-containing monomer optionally comprises one or more of esters of (meth)acrylic acid. This may be the case, for example, if the polymer is an emulsion polymer. In general, the preferred alkyl esters of (meth)acrylic acids may be selected from $C_1$-$C_{10}$ alkyl (meth)acrylate, preferably $C_1$-$C_{10}$-alkyl (meth)acrylates. Examples of such acrylate monomers include n-butyl acrylate, secondary butyl acrylate, ethyl acrylate, hexyl acrylate, tert-butyl acrylate, 2-ethyl-hexyl acrylate, isooctyl acrylate, 4-methyl-2-pentyl acrylate, 2-methylbutyl acrylate, methyl methacrylate, butyl methacrylate, n-butyl methacrylate, isobutyl methacrylate, ethyl methacrylate, isopropyl methacrylate, hexyl methacrylate, 2-ethylhexyl methacrylate, cyclohexyl methacrylate and cetyl methacrylate. Other esters of (meth)acrylic acids include 4-acetoxyphenethyl (meth)acrylate, (meth)acryloyl chloride, 4-(meth)acryloylmorpholine, 2-(4-benzoyl-3-hydroxyphenoxy)ethyl (meth)acrylate, [2-((meth)acryloyloxy)ethyl]trimethylammonium chloride, benzyl 2-propyl(meth)acrylate, sec-butyl methacrylate, tert-butyl (meth)acrylate, 2-[[(butylamino)carbonyl]oxy]ethyl (meth)acrylate, tert-butyl 2-bromo(meth)acrylate, 4-tert-butylcyclohexyl (meth)acrylate, 2-carboxyethyl (meth)acrylate, 2-chloroethyl (meth)acrylate, di(ethylene glycol) ethyl ether (meth)acrylate, di(ethylene glycol) 2-ethylhexyl ether (meth)acrylate, 2-(dimethylamino)ethyl (meth)acrylate, 3-(dimethylamino)propyl (meth)acrylate, dipentaerythritol penta-/hexa-(meth) acrylate, 2-ethoxyethyl (meth)acrylate, methyl acrylate, 2-ethyl(meth)acryloyl chloride, ethyl 2-(bromomethyl) (meth)acrylate, ethyl cis-(β-cyano) (meth)acrylate, ethylene glycol dicyclopentenyl ether (meth)acrylate, ethylene glycol phenyl ether (meth)acrylate, ethyl 2-ethyl(meth)acrylate, ethyl 2-propyl(meth)acrylate, ethyl 2-(trimethylsilylmethyl) (meth)acrylate, 4-hydroxybutyl (meth)acrylate, 2-hydroxyethyl (meth)acrylate, 2-hydroxypropyl (meth)acrylate, 3-hydroxypropyl (meth)acrylate, 2-hydroxy-3-phenoxypropyl (meth)acrylate, hydroxypropyl (meth)acrylate, isobornyl (meth)acrylate, isobutyl acrylate, isooctyl methacrylate, lauryl (meth)acrylate, methyl 2-acetamido(meth)acrylate, tetrahydrofurfuryl (meth)acrylate, 3-(trimethoxysilyl)propyl (meth)acrylate, 3,5,5-trimethylhexyl (meth)acrylate, 10-undecenyl (meth)acrylate, maleic acid, maleic anhydride, dimethyl maleate, diethyl maleate, dipropyl maleate, dibutyl maleate, di 2-ethylhexyl maleate (and the corresponding half esters of maleic acid), fumaric acid, dimethyl fumarate, diethyl fumarate, dipropyl fumarate, dibutyl fumarate, di 2-ethyl hexyl fumarate (and the corresponding half esters of fumaric acid), methyl α-bromo(meth)acrylate, methyl 2-(bromomethyl) (meth)acrylate, pentabromobenzyl (meth)acrylate, pentabromophenyl (meth)acrylate, pentafluorophenyl (meth)acrylate, poly(ethylene glycol) acrylate, methyl 2-(chloromethyl) (meth)acrylate, methyl 3-hydroxy-2-methylenebutyrate, methyl 2-(trifluoromethyl) (meth)acrylate, octadecyl (meth)acrylate, and poly(ethylene glycol) methyl ether (meth)acrylate. For example, one or more of the above-mentioned monomers may be a major monomer in that it provides more than 50 mol % of the ester-containing monomer content. Additionally or alternatively, one or more of the above-mentioned monomers may be a minor monomer in that it provides less than 50 mol % of the ester-containing monomer content.

Residues of other monomers may be included as co-monomers, including ethylene, 4-acetoxyphenethyl acrylate, acryloyl chloride, 4-acryloylmorpholine, 2-(4-benzoyl-3-hydroxyphenoxy)ethyl acrylate, [2-(acryloyloxy)ethyl]trimethylammonium chloride, benzyl 2-propylacrylate, butyl acrylate, tert-butyl acrylate, 2-[[(butylamino)carbonyl]oxy] ethyl acrylate, tert-butyl 2-bromoacrylate, 4-tert-butylcyclohexyl acrylate, 2-carboxyethyl acrylate, 2-chloroethyl acrylate, di(ethylene glycol) ethyl ether acrylate, di(ethylene glycol) 2-ethylhexyl ether acrylate, 2-(dimethylamino)ethyl acrylate, 3-(dimethylamino)propyl acrylate, dipentaerythritol penta-/hexa-acrylate, 2-ethoxyethyl acrylate, ethyl acrylate, 2-ethylacryloyl chloride, ethyl 2-(bromomethyl)acrylate, ethyl cis-(β-cyano)acrylate, ethylene glycol dicyclopentenyl ether acrylate, ethylene glycol phenyl ether acrylate, ethyl 2-ethylacrylate, 2-ethylhexyl acrylate, ethyl 2-propylacrylate, ethyl 2-(trimethylsilylmethyl)acrylate, hexyl acrylate, 4-hydroxybutyl acrylate, 2-hydroxyethyl acrylate, 2-hydroxy-3-phenoxypropyl acrylate, hydroxypropyl acrylate, methyl acrylate, isobornyl acrylate, isobutyl acrylate, isooctyl acrylate, lauryl acrylate, methyl 2-acetamidoacrylate, tetrahydrofurfuryl acrylate, 3-(trimethoxysilyl)propyl acrylate, 3,5,5-trimethylhexyl acrylate, 10-undecenyl acrylate, methyl methacrylate, maleic acid, maleic anhydride, dimethyl maleate, diethyl maleate, dipropyl maleate, dibutyl maleate, di 2-ethylhexyl maleate (and the corresponding half esters of maleic acid), fumaric acid, dimethyl fumarate, diethyl fumarate, dipropyl fumarate, dibutyl fumarate, di 2-ethyl hexyl fumarate (and the corresponding half esters of fumaric acid), methyl α-bromoacrylate, methyl 2-(bromomethyl)acrylate, pentabromobenzyl acrylate, pentabromophenyl acrylate, pentafluorophenyl acrylate, poly(ethylene glycol) acrylate, methyl 2-(chloromethyl)acrylate, methyl 3-hydroxy-2-methylenebutyrate, methyl 2-(trifluoromethyl)acrylate, octadecyl acrylate, and poly(ethylene glycol) methyl ether (meth)acrylate. Such co-monomers may comprise esters of acrylic acid or (meth) acrylic acid, for example.

For the avoidance of doubt, it is hereby stated that the term "monomer" applies to oligomers and polymers that comprise a polymerisable carbon-carbon double bond. Such oligomers comprise fewer than five repeat units, whereas polymers comprise five or more repeat units.

The sulphur or phosphorous-containing polymer optionally comprises residues from more than one monomer comprising a sulfonate, sulfonic acid, sulfonic ester, sulfonamide or sulfonyl halide group (or a salt or ester thereof).

The statements below in relation to the monomer comprising a sulfonate, sulfonic acid, sulfonic ester, sulfonamide or sulfonyl halide group (or a salt or ester thereof) may apply to one or more such monomers used to make the sulphur or phosphorous-containing polymer.

The monomer comprising a sulfonate, sulfonic acid or sulfonic ester, sulfonamide or sulfonyl halide group (or a salt or ester thereof) typically comprises a polymerisable C=C group attached to a sulfonate ($SO_3^-$) group (optionally provided as a salt, such as a sodium salt), a sulfonic acid ($—SO_3H$) group, a sulfonic ester ($—SO_3R$, where R is any suitable group and may, for example, be optionally substituted alkyl (e.g. $C_1$ to $C_{10}$ alkyl), aryl (e.g. $C_5$ to $C_{10}$ aryl) or alkenyl (e.g. $C_1$ to $C_{10}$ alkenyl)), a sulfonamide (primary, secondary or tertiary) or a sulfonyl halide ($—SO_3X$, where X is halogen), optionally via a linker. In general, it is preferred that there is a linker group, such as an alkylene linker (optionally substituted and optionally branched), the alkylene linker optionally comprising a $C_1$-$C_6$ alkylene group, such as a methylene linker group between the polymerisable C=C group and the sulfonate, sulfonic acid, sulfonic ester, sulfonamide or sulfonyl halide group.

The linker group may comprise a chain of up to 10 atoms, optionally up to 8 atoms and optionally up to 5 atoms. The linker group optionally comprises one or more ether and/or secondary or tertiary amino groups. The linker group is optionally substituted, optionally with one or more alkyl (e.g. $C_1$ to $C_{10}$ alkyl), halo or hydroxyl groups.

Examples of monomers comprising sulfonate, sulfonic acid, sulfonic ester, sulfonamide or sulfonyl halide groups (or a salt or ester thereof) include sodium vinyl sulfonate, sodium (meth)allyl sulfonate, sodium allyl sulfonate, 2-methyl-2-propene-1-sulfonic acid sodium salt and 2-acrylamido-2-methylpropane sulfonic acid sodium salt, 3-sulfopropyl (meth)acrylate, sodium α-methylstyrene sulfonate, sodium ethyl styrene sulfonate, sodium 1-allyloxy-2-hydroxypropyl sulfonate. Likewise, linear or branched $C_1$-$C_{10}$-alkylsulfonamides of acrylic acid or of methacrylic acid are suitable. Also suitable are ω-alkene-1-sulfonic acids having 2 to 10 C atoms. Other examples include, vinylsulfonic acid, allylsulfonic acid, methallylsulfonic acid, 2-methacrylamido-2-methylpropanesulfonic acid, 2-acrylamidoethanesulfonic acid, 2-acryloyloxyethanesulfonic acid, 2-methacryloyloxyethanesulfonic acid, 3-acryloyloxypropanesulfonic acid, 2,2-ethylhexylaminoethane sulfonic acid and 2-methacryloyloxypropanesulfonic acid, Sodium 4-vinylbenzenesulfonate and salts and esters thereof.

The C=C group may optionally be substituted at one, two or three positions. For example, each substituent present may optionally be selected from one or more of halo, hydroxy or an optionally substituted $C_1$ to $C_6$ alkyl group.

The sulphur or phosphorous-containing polymer may comprise up to 10 mol %, optionally up to 7 mol %, optionally up to 5 mol %, optionally up to 3 mol %, optionally up to 2 mol %, optionally up to 1 mol %, optionally at least 0.05 mol %, optionally at least 0.1 mol %, optionally at least 1 mol %, optionally at least 1.5 mol %, optionally from 1 mol % to 10 mol %, optionally from 1 mol % to 7 mol %, optionally from 2 mol % to 7 mol %, optionally from 2 mol % to 5 mol % and optionally from 3 to 5 mol % residues of monomers (a) or (b), based on the residue content of the one or more ester-containing monomers.

The sulphur or phosphorous-containing copolymer optionally comprises residues of monomers (i) or (ii). For example, the copolymer optionally comprises residues of vinyl or vinyl aromatic monomers, such as ethylene, styrene, alpha-methyl styrene, p-methyl styrene, t-butyl styrene or vinyl toluene. The sulphur or phosphorous-containing polymer may also comprise residues of one or more of a solvent, chain transfer agent and an initiator.

The sulphur or phosphorous-containing polymer optionally comprises at least 90% (optionally at least 95% and optionally at least 98%) by weight of residues of monomers (i) and (ii), optionally some of the ester residues being hydrolysed to provide a degree of hydrolysis of up to 60 mol %, the remainder of the sulphur or phosphorous-containing polymer being provided by other residues not being residues of monomers (i) or (ii), such as residues of solvent, chain transfer agent and initiator.

If the sulphur or phosphorous-containing polymer comprises one or more residues of monomer (b) which have the structure of Formula (1), optionally two of X, Y and Z comprise —OH or a salt or ester thereof, in which case said two of X, Y and Z may be the same or different.

Optionally, two of X, Y and Z may comprise at least one (and optionally only one) polymerisable carbon-carbon double bond, in which case said two of X, Y and Z may be the same or different.

Said ester of the —OH group may, for example, comprise an alkyl (e.g. $C_1$ to $C_{10}$ alkyl) ester.

The residue of monomer (b) of Formula (1) may comprise a phosphonate, phosphonic acid, phosphonic ester, phosphonamide or phosphonyl halide group (or salts or esters thereof) and at least one polymerisable carbon-carbon double bond per monomer, and a phosphonate, phosphonic acid, phosphonic ester, phosphonamide or phosphonyl halide group (or salts or esters thereof).

The group(s) comprising at least one (and optionally only one) polymerisable carbon-carbon double bond may comprise an acrylic acid group (or ester or salt thereof), an acrylamide group (or derivative thereof) or may comprise a vinyl or allyl group, for instance.

The monomer(s) comprising at least one phosphonic acid group (or salt or ester thereof) may optionally be selected from the group consisting of vinylphosphonic acid (and methyl ester), 2-propene phosphonic acid (and diethyl ester), phosphoric acid 2-hydroxyethyl (meth)acrylate ester, 2-(methacryloyloxy)ethyl phosphate, α-(dialkylphosphonate) acrylate, β-(dialkylphosphonate) acrylate, dialkylphosphonate (meth)acrylate, N-(dialkylphosphonate) (meth) acrylamide, dimethyl (methacryloyloxy) methyl phosphonate, dialkyl vinyl phosphonates (such as dimethyl vinyl phosphonate, diethyl vinyl phosphonate, diisopropyl vinyl phosphonate), allylphosphonic acid & allylphosphonic acid monoammonium salt, dimethyl-1-allyloxymethylphosphonate, dialkyl vinyl ether phosphonates (such as 2-vinyloxyethyl phosphonate), diethyl 2-butenylphosphonate, bis(2- methacryloxyethyl)phosphate, phosphate esters of polyethylene glycol monomethacrylate, phosphate esters of polypropylene glycol mono(meth)acrylate, para-vinylbenzyl phosphonate, diethylbenzyl phosphonate, and salts and esters thereof.

For example, the sulphur or phosphorous-containing polymer may comprise residues of one or more monomers (b) of Formula (1), and substantially no residues of monomer (a).

The sulphur or phosphorous-containing polymer is optionally not hydrolysed to any significant degree. In this case, the degree of hydrolysis is optionally no more than 10 mol %, optionally no more than 5 mol % and optionally substantially nil. The applicant has discovered that surprisingly the unhydrolysed copolymer can perform well as a secondary stabilising agent in the suspension polymerisation of vinyl compounds. This is particularly the case when the polymer is provided as an emulsion.

The sulphur or phosphorous-containing polymer is optionally essentially a linear polymer, or a mixture of linear polymers.

Alternatively, the sulphur or phosphorous-containing polymer may be a branched polymer, or mixture of branched polymers, or mixture of a branched polymer and a linear polymer. Therefore, the copolymer may comprise residues of one or more polyunsaturated monomer, each comprising a plurality of polymerisable unsaturated groups, such as C═C groups. Said monomers may lead to the incorporation of branching into the sulphur or phosphorous-containing polymer.

Alternatively, the sulphur or phosphorous-containing polymer may be a crosslinked polymer, or mixture of cross-linked polymers, or a mixture of crosslinked polymers, or a mixture of a crosslinked polymer and a branched polymer, or a mixture of a crosslinked polymer and a linear polymer. Therefore, the sulphur or phosphorous-containing copolymer may comprise residues of one or more polyunsaturated monomer, each comprising a plurality of polymerisable unsaturated groups, such as C═C groups. Said monomers may lead to the incorporation of branching or crosslinking into the sulphur or phosphorous-containing polymer.

At least one (optionally each) polyunsaturated monomer may comprise any monomer which can be polymerised by a free radical mechanism. The term "monomer" also includes suitably reactive oligomers (typically comprising fewer than 5 repeat units), or polymers (typically comprising 5 or more repeat units).

One or more (and optionally each) of the carbon-carbon double bonds (if present) of at least one (and optionally each) polyunsaturated monomer may be an ethylenic carbon-carbon double bond.

At least one polyunsaturated monomer optionally comprises at least two (and optionally at least three) polymerisable (optionally carbon-carbon) double bonds per molecule.

At least one polyunsaturated monomer may comprise a di-unsaturated monomer i.e. comprises two, and no more than two, polymerisable (optionally carbon-carbon) double bonds. Examples of suitable bi-unsaturated monomers include di(meth)acrylate or diallyl compounds, such as diacrylates and di(meth)acrylates, such as ethylene glycol di (meth) acrylate, hexanediol di (meth) acrylate, tripropylene glycol di (meth) acrylate, butanediol di (meth) acrylate, neopentyl glycol di (meth) acrylate, diethylene glycol di (meth) acrylate, triethylene glycol di (meth) acrylate, dipropylene glycol di (meth) acrylate and vinyl acrylates, such as allyl (meth) acrylate, butadiene, diallyl succinate, diallyl carbonate, diallyl phthalate and substituted analogues thereof.

For example, at least one polyunsaturated monomer may be a tri-unsaturated monomer i.e. comprises three, and no more than three, polymerisable (optionally carbon-carbon) double bonds.

Examples of tri-unsaturated monomers include tripropylene glycol tri (meth) acrylate, trimethylol propane tri (meth) acrylate, pentaerythritol tri (meth)acrylate, 1,3,5-triallyl-1, 3,5-triazine-2,4,6(1H,3H,5H)-trione ("TTT"), or diallyl maleate. Those skilled in the art will realise that other tri-unsaturated monomers may be used.

At least one polyunsaturated monomer may comprise a tetra-unsaturated monomer which comprises four (and only four) polymerisable (optionally carbon-carbon) double bonds. Examples of tetra-unsaturated monomers are pentaerythritol tetra (meth)acrylate.

At least one polyunsaturated monomer may comprise a penta-unsaturated monomer which comprises five (and only five) polymerisable (optionally carbon-carbon) double bonds. Examples of penta-unsaturated monomers include: glucose penta(meth)acrylate.

The sulphur or phosphorous-containing polymer may optionally comprise residues of one or more chain transfer agents. Such chain transfer agents may be used to control polymer weight. The one or more chain transfer agents may comprise a thiol, an alcohol or a carbonyl containing moiety. The thiol may comprise N-dodecyl mercaptan, tertiary-dodecyl mercaptan, tert-nonyl mercaptan, pentaerythritol tetrakis (2-mercaptoacetate) or pentaerythritol tetrakis (3-mercaptopropionate), for example. The chain transfer agent may comprise an alcohol, such as methanol, ethanol, iso-propyl alcohol, butanol or the chain transfer agent may comprise a carbonyl containing compound, such as an acetaldehyde, propionaldehyde, butyl aldehyde, pentanaldehyde, hexyl aldehyde, benzyl aldehyde, acetone, methyl ethyl ketone. Other suitable chain transfer agents may be found in Kinetics and Mechanisms of Polymerization, Volume 1, part 1, Chapter 1-12 and Chapter 4-2 Part C, 1967, Marcel Dekker Inc., for example.

The amount of chain transfer agent used in the process to produce the sulphur or phosphorous-containing polymer will depend very much on the efficiency of the chain transfer agent. Efficient chain transfer agents (such as thiols) may typically be provided in much smaller amounts than less efficient chain transfer agents (such as iso-propyl alcohol).

The sulphur or phosphorous-containing polymer may optionally comprise residues of one or more polymerisation initiators. Such initiators are capable of generating free radicals. The initiator may, for example, comprise an azo initiator, such as azobis (isobutyronitrile) (AIBN), azobis (2-methylbutyronitrile), azobis (2,4-dimethylvaleronitrile), azobis (4-cyanovaleric acid) or an oxidizing agent, such as a persulfate (such as potassium persulfate, sodium persulfate or sodium persulfate), hydrogen peroxide, tertiary butyl hydrogen peroxide, or an oil soluble peroxy ester such as dilauryl peroxide, or tert-butyl peroxyneodecanoate, dibenzoyl peroxide, dicumyl peroxide, tert-butyl peroxy-2-ethyl hexanoate, tert-butyl peroxy diethyl acetate and tert-butyl peroxy benzoate, a peroxydicarbonate such as di(n-propyl) peroxydicarbonate Di(2-ethylhexyl) peroxy dicarbonate or di (4-tertiary-butyl cyclohexyl) perdicarbonate, or a redox couple such as a peroxide in combination with reducing agent, such as hydrogen peroxide and sodium formaldehyde sulfoxylate or sodium dithionite or sodium metabisulfite or ascorbic acid, further examples of redox initiators may be found in US2007/0184732, in particular in paragraph [0043] or a combination of initiators. Examples of photoinitiator systems may be found in U.S. Pat. No. 8,603,730, in particular in the text bridging cols. 6 and 7. Optionally, the initiator may comprise a system which is capable of generating a controlled radical polymerisation, such as RAFT (reversible addition fragmentation chain transfer), ATRP (atomic-transfer radical-polymerisation) or NMP (nitroxide-mediated radical polymerisation).

The number average molecular weight of the sulphur or phosphorous-containing polymer, $M_n$, is optionally no more than 150,000 gmol$^{-1}$, optionally no more than 100,000 gmol$^{-1}$, optionally no more than 50,000 gmol$^{-1}$, optionally no more than 8,000 gmol$^{-1}$ and optionally no more than 5,000 gmol$^{-1}$. The number average molecular weight may be at least 1,000 gmol$^{-1}$ and optionally at least 2,000 gmol$^{-1}$. The number average molecular weight is optionally from 1,200 to 150,000 gmol$^{-1}$, optionally from 1,400 to 75,000 gmol$^{-1}$, optionally from 1,500 to 50,000 gmol$^{-1}$, optionally from 2,000 to 50,000 gmol$^{-1}$ and optionally from 3,000 to 45,000 gmol$^{-1}$.

The weight average molecular weight, $M_w$, of the sulphur or phosphorous-containing polymer is optionally no more than 2,000,000 gmol$^{-1}$, optionally no more than 1,000,000 gmol$^{-1}$, optionally no more than 800,000 gmol$^{-1}$, optionally no more than 600,000 gmol$^{-1}$, optionally no more than 300,000 gmol$^{-1}$, optionally no more than 50,000 gmol$^{-1}$ and optionally no more than 25,000 gmol$^{-1}$. The weight average molecular weight may be at least 5000 gmol$^{-1}$, optionally at least 10,000 gmol$^{-1}$, optionally at least 15,000 gmol$^{-1}$, optionally at least 30,000 gmol$^{-1}$, optionally at least 50,000 gmol$^{-1}$, optionally at least 80,000 gmol$^{-1}$ and optionally at least 100,000 gmol$^{-1}$. The weight average molecular weight is optionally from 5,000 to 750,000 gmol$^{-1}$, optionally from 10,000 to 650,000 gmol$^{-1}$, optionally from 50,000 to 600,000 gmol$^{-1}$, optionally from 70,000 to 600,000 gmol$^{-1}$ and optionally from 100,000 to 550,000 gmol$^{-1}$.

The molecular weights, $M_w$ and $M_n$, mentioned above were measured by size exclusion chromatography (SEC) (also known as gel permeation chromatography, GPC) in THF solution. The sample was injected into a PL-GPC-50 system via autosampler, using stabilised THF as a mobile phase and three PL gel columns in series, each column having dimensions of 300 mm×7.5 mm×10 µm. The system was calibrated with polystyrene standards in the Mp molecular weight range of 6,035,000-580 gmol$^{-1}$.

The sulphur or phosphorous-containing polymer may comprise one or more coagulation inhibitors. The one or more coagulation inhibitors may comprise one or more of one or more surfactants and one or more water-soluble polymers, often known to those skilled in the art as "colloids". The coagulation inhibitors inhibit coalescence of particles of polymer, and stabilise the emulsion.

Optionally, the surfactant may be anionic, non-ionic or cationic.

The surfactant may optionally be used in amounts of from 0 to 20 wt %, preferably from 0 to 10 wt %, more preferably from 0 to 5 wt %, parts by weight, based on the total weight of the monomers (i.e. monomers (i) and (ii)). The amount of surfactant optionally comprises from 0.1 wt %, optionally from 0.5 wt % and optionally from 1 wt %, based on the total weights of the monomers as defined above. The amount of surfactant optionally comprises up to 2 wt %, optionally up to 3 wt %, optionally up to 5 wt %, optionally up to 10 wt %, based on the total weight of the monomer. The sulphur or phosphorous-containing polymer may be synthesised without surfactants.

One or more colloids can also be used instead of, or in addition to, one or more surfactants. Suitable colloids include polyhydroxy compounds, such as partially acetylated polyvinyl alcohol, casein, hydroxyethyl starch, carboxymethylcellulose, hydroxyethylcellulose, hydroxypropylcellulose, polyethylene glycol and gum arabic. The one or more colloids may comprise polyvinyl alcohols. In general, these protective colloids are used in contents of from 0 to 10 wt %, optionally from 0 to 5 wt %, based on the total weight of the monomers, as defined above. The amount of surfactant optionally comprises from 0.1 wt %, optionally from 0.5 wt % and optionally from 1 wt %, based on the total weights of the monomers as defined above. The amount of surfactant optionally comprises up to 2 wt %, optionally up to 3 wt %, optionally up to 5 wt %, optionally up to 10 wt %, and optionally up to 20 wt % based on the total weight of the monomer. The sulphur or phosphorous-containing polymer may be synthesised without colloids.

The sulphur or phosphorous-containing polymer may exist in the form of an emulsion. The polymer particle size is optionally at 40 nm to 1000 nm, optionally 100 nm to 800 nm and optionally 200 nm to 600 nm.

The particle sizes of the emulsions were measured by light transmission using a LUMiSizer® 6512-12. Measures were carried out at 25° C., at 4,000 rpm rotor speed and a wavelength of 470 nm. 500 profiles at 30 s interval were measured to obtained final particle size.

The emulsion, when initially made, optionally has a total solid content of at least 15%, optionally at least 35%, optionally no more than 65% and optionally no more than 60%. The emulsion is optionally diluted before being added to the suspension polymerisation reagents.

Optionally, the emulsion when made may be concentrated by the removal of volatile components. Optionally the emulsion may be freed from water by any of the known processes known in the state of the art such as spray drying or coagulation using salts and subsequent filtration. Optionally the dried polymer may be provided with a free flow agent such as calcium carbonate or silica to prevent "blocking" of the dry powder.

The pH of the emulsion, when initially made, may be no more than 9, optionally no more than 7, optionally no more than 6.5, optionally from 4 to 6 and optionally from 1 to 2. The pH values mentioned above may be particularly applicable if the ester monomer comprises vinyl acetate or like monomers. The pH of the diluted emulsion (as is added to a suspension polymerisation reagents, for example) will depend accordingly on the dilution of the emulsion. The emulsion optionally comprises one or more buffers. The buffer keeps the pH in a desired range (for example, from 4 to 6), which may inhibit reduction of the pH to levels at which unwanted hydrolysis of the polymer takes place.

As mentioned above, the polyvinyl chloride polymer may typically be made using suspension polymerisation. Suspension polymerisation is well-known to those skilled in the art, and is as defined by IUPAC. Suspension polymerisation is polymerisation in which polymer is formed in monomer or monomer-solvent droplets in a continuous phase that is a non-solvent for both the monomer and the polymer formed. Furthermore, the droplets have mean diameters exceeding 1 micron, typically exceeding 5 microns and optionally exceeding 10 microns. This definition is to be found in Pure Appl Chem, vol. 83, no. 12, pp 2229-2259, September 2011, "Terminology of polymers and polymerisation in dispersed phases (IUPAC Recommendations 2011)". Likewise, those skilled in the art will understand the term "secondary suspending agent". For the avoidance of doubt, secondary suspending agents are described in Ullmann's Encyclopedia of Industrial Chemistry, 5$^{th}$ Edition, vol. A21, pages 717-742, 1992, VCH Publishers Inc, in particular, pages 721-723. For the avoidance of doubt, the above-mentioned reference refers to "secondary protective colloids", instead of "secondary suspending agent". The teaching of the above-mentioned reference in relation to "secondary protective colloids" is incorporated herein by reference. Secondary suspending agents are also known as secondary stabilisers.

It has surprisingly been found that PVC polymer produced in the presence of the sulphur or phosphorous-containing polymer displays enhanced powder flow and beneficial melt processing properties, coupled with less colour development, as well as the sulphur or phosphorous-containing polymer acting as a secondary suspending agent in the PVC polymerisation reaction. The sulphur or phosphorous-containing polymer has also been observed to enhance the porosity of the suspension polymer, such that residual monomers trapped within the suspension polymer grains can be more easily removed, where more easily removed implies a reduced temperature required to strip the polymer, or a lower duration of the time required to strip the suspension polymer, when compared to the suspension polymer prepared in the absence of the emulsion of this invention. The enhanced ease of removal of residual monomer is evidenced herein by an increase in the cold plasticiser absorption (CPA).

The amount of said sulphur or phosphorus-containing polymer used may vary, and is optionally at least 100 ppm, at least 200 ppm, at least 300 ppm, at least 400 ppm, at least 500 ppm, at least 600 ppm, at least 700 ppm, at least 800 ppm, at least 900 ppm, at least 1000 ppm, at least 1200 ppm, at least 1400 ppm, at least 1600 ppm, at least 1800 ppm, at least 2000 ppm, at least 3000 ppm, at least 5000 ppm, and optionally at least 10,000 ppm, based on the mass of monomers used to synthesise the polyvinyl chloride polymer.

The amount of said sulphur or phosphorus-containing polymer used may vary, and is optionally up to 50,000 ppm, up to 20,000 ppm, up to 10,000 ppm, up to 5,000 ppm, up to 3000 ppm, up to 2,000 ppm and optionally up to 1,000 ppm, based on the mass of monomers used to synthesise the polyvinyl chloride polymer.

In accordance with a second aspect of the present invention, there is provided a suspension polymerisation reaction composition for synthesising a polyvinyl chloride polymer comprising;

a continuous phase in which is dispersed droplets of one or more monomers to be polymerised;

one or more primary suspending agents;

a sulphur or phosphorous-containing polymer as defined in relation to the use of the first aspect of the present invention, the sulphur or phosphorous-containing polymer providing processing aid properties to the polyvinyl chloride polymer; and optionally one or more secondary suspending agents.

For example, the sulphur or phosphorous-containing polymer may be made by emulsion polymerisation.

For example, the one or more monomers may comprise one or more of a vinyl halide (such as vinyl chloride or vinylidene chloride). The one or more monomers may comprise one or more of an alkenyl alkanoate (such as a $C_1$ to $C_6$ alkenyl alkanoate, such as vinyl acetate), an alkyl acrylate e.g. $C_1$ to $C_6$ alkyl acrylate (such as ethyl acrylate, butyl acrylate or 2-ethylhexyl acrylate), an alkyl methacrylate e.g. $C_1$ to $C_6$ alkyl methacrylate (such as methyl methacrylate) or acrylonitrile. Such co-monomers, if present, are typically provided in a smaller amount than the "main" monomer. The copolymers may have a statistical or a blocky distribution of monomer units along the polymer chain. Preferably, the poly(vinyl chloride) is selected from a poly(vinyl chloride) homopolymer and copolymers with vinyl acetate, acrylonitrile and/or an alkyl (meth)acrylate (e.g. $C_1$ to $C_6$ alkyl(meth)acrylate), such as vinyl chloride/vinyl acetate copolymer. For example, in the production of PVC, vinyl chloride is provided in greater amounts than the copolymers which may comprise, for example, vinyl acetate and vinyl alcohol.

The polyvinyl chloride polymer may have the properties described above in relation to the use of the first aspect of the present invention.

The primary suspending agent may optionally comprise one or more polyvinyl acetates, typically having a degree of hydrolysis of about 70-90 mol % (the suspending agent therefore being a poly(vinyl acetate)-co-poly(vinyl alcohol)), and are also known as partially hydrolysed polyvinyl acetate or polyvinyl alcohols. The primary suspending agent may comprise more than one component. Optionally, the primary suspending agent may comprise a cellulosic polymer, such as hydroxypropyl methyl cellulose or hydroxyethyl cellulose for example. Specific examples of primary suspending agents are listed in Ullmann's Encyclopedia of Industrial Chemistry, 5th Edition, 1992, page 722, Table 3, the teaching of which is incorporated herein by reference.

The one or more monomers to be polymerised may be polymerisable using free radical polymerisation, and therefore the reaction composition may be suitable for free radical polymerisation. The polymerisation process may be an addition polymerisation process. The polymerisation process may be a controlled living radical process.

The sulphur or phosphorous-containing polymer may optionally act as a secondary suspending agent. If the sulphur or phosphorous-containing polymer does not act as a secondary suspending agent, then a secondary suspending agent would typically be added in addition to the sulphur or phosphorous-containing polymer.

The composition optionally comprises one or more initiators and one or more further secondary suspending agents. The continuous phase is typically aqueous.

The composition optionally comprises 100 parts by weight of the one or more monomers to be polymerised, 85 to 130 parts by weight (e.g. 90 to 130 parts by weight) of continuous phase (e.g. water), 0.04 to 0.22 parts by weight (e.g. 0.05 to 0.15 parts by weight) of primary suspending agent, 0.001 to 0.20 parts by weight of said secondary suspending agent comprising said polymer, and 0.03 to 0.15 parts by weight (e.g. 0.03 to 0.12 parts by weight, or 0.03 to 0.10 parts by weight) of initiator.

In order to improve the morphology of the poly(vinyl chloride) grains obtained further additives can be added, such as one or more of:

one or more further secondary suspending agents, one or more tertiary suspending agents, one or more buffers, oxygen, one or more chain-transfer or chain-extending agents, and one or more chain-terminators, one or more antioxidants, and one or more build up suppressants. The main function of the primary protective colloids is to control the grain size but they also affect porosity and other morphological properties. Furthermore additional quantities of the Primary suspending agent or another polyvinyl alcohol may be added during the polymerisation to enhance bulk density, optionally to control foam and prevent poor thermal history in the polymer.

A range of free radical initiators soluble in the monomer(s) can be used, including diacetyl peroxides, peroxydicarbonates, and alkyl peroxyesters as well as azo initiators and benzoyl peroxide. Mixtures of different initiators can also be used. Specific examples of initiators are listed in Ullmann's Encyclopedia of Industrial Chemistry, 5th Edition, 1992, page 723, Table 4, the teaching of which is incorporated herein by reference.

The initiator(s) may, or may not be provided as an aqueous dispersion, or as a solution in hydrocarbon oil. The initiator-containing dispersion or solution (if present) may be mixed external to the reactor or may be mixed in the reactor.

The composition optionally, comprises a greater weight of primary suspending agent than any secondary suspending agent (including the sulphur or phosphorous-containing polymer, if acting as a secondary suspending agent). The composition optionally comprises a greater weight of secondary suspending agent than primary suspending agent.

The weight of the primary suspending agent used in the composition is optionally at least 0.02 times, optionally at least 0.1 times, optionally at least 1.0 times, optionally at least 1.5 times, optionally at least 1.8 times and optionally at least 2.0 times, optionally at least 5.0 times, optionally at least 10 times, optionally at least 20 times, optionally at least 30 times, optionally at least 50 times and optionally at least 90 times the weight of secondary suspending agent used.

The composition optionally comprises 20 to 20,000 ppm of said sulphur or phosphorous-containing polymer relative to the weight of said one or more monomers to be polymerised, optionally from 50 to 10,000 ppm, optionally from 100 to 1000 ppm, optionally from 100 to 600 ppm and optionally from 200 to 500 ppm. The ppm amounts calculated are based on the solid content of the polyvinyl chloride polymer synthesised from the composition.

The composition optionally comprises one or more initiators. A range of free radical initiators soluble in the monomer(s) can be used in suspension and mass polymerisation, including diacetyl peroxides, peroxydicarbonates, and alkyl peroxyesters as well as azo initiators and benzoyl peroxide. Mixtures of different initiators can also be used. Specific examples of initiators are listed in Ullmann's Encyclopedia of Industrial Chemistry, 5th Edition, 1992, page 723, Table 4, the teaching of which is incorporated by reference.

As mentioned above, the one or more monomers to be polymerised optionally comprises vinyl chloride and optionally a copolymer. Within this application, the term "poly(vinyl chloride)" includes homopolymers of vinyl chloride as well as copolymers of vinyl chloride with up to 60% by weight, typically up to 30% by weight, preferably up to 20% by weight, more preferably up to 17% by weight (based on total weight of monomers) of one or more comonomers. Typically, the comonomer is selected from vinylidene chloride, vinyl acetate, methyl (meth)acrylate, ethyl (meth)acrylate, propyl (meth)acrylate, butyl (meth)acrylate, t-butyl (meth)acrylate, 2-ethyl hexyl (meth)acrylate, hydroxyalkyl acrylate, (meth)acrylic acid, (meth)acrylonitrile, vinyl isobutyl ether, vinyl fluoride, vinylidene fluoride, maleic anhydride and esters thereof, ethylene, propylene, styrene and butadiene and mixtures thereof. The copolymers may have a statistical or a blocky distribution of monomer units along the polymer chain. Preferably, the poly(vinyl chloride) is selected from a poly(vinyl chloride) homopolymer and copolymers with vinyl acetate, acrylonitrile and/or an alkyl (meth)acrylate such as vinyl chloride/vinyl acetate copolymer, typically comprising 83 to 93% by weight of polymerized vinyl chloride units and 7 to 17% by weight of polymerized vinyl acetate units; vinyl chloride/acrylonitrile copolymer, typically comprising 40 to 75% by weight of polymerized vinyl chloride units and 25 to 60% by weight of polymerized acrylonitrile units; and vinyl chloride/alkyl (meth)acrylate copolymer, typically comprising 98 to 75% by weight of polymerized vinyl chloride units and 2 to 25% by weight of polymerized alkyl (meth)acrylate units. Most preferably, the poly(vinyl chloride) is poly(vinyl chloride) homopolymer. The polyvinyl chloride polymer of the use of the first aspect of the present invention may comprise the features of the polyvinyl polymer described above in relation to the composition of the second aspect of the present invention.

In accordance with a third aspect of the present invention, there is provided a method of making a polyvinyl chloride polymer using suspension polymerisation, the method comprising:

polymerising one or more monomers in the presence of a sulphur or phosphorous-containing polymer as described in the relation to the use of the first aspect of the present invention, the sulphur or phosphorous-containing polymer providing processing aid properties to the polyvinyl chloride polymer.

The method may comprise polymerising one or more monomers in the presence of one or more primary suspending agents.

The method may comprise polymerising one or more monomers in the presence of one or more secondary suspending agents. The sulphur or phosphorous-containing polymer may act as a secondary suspending agent.

The method may comprise polymerising one or more monomers in the presence of one or more initiators.

The method may comprise polymerising one or more monomers in the presence of one or more of:

one or more further secondary suspending agents, one or more tertiary suspending agents, one or more buffers, oxygen, one or more chain-transfer or chain-extending agents, and one or more chain-terminators, one or more antioxidants, and one or more build up suppressants.

The method optionally comprises providing an initial charge to a reactor comprising a liquid forming the continuous phase (typically water), optionally said sulphur or phosphorous-containing polymer, and optionally one or more primary suspending agents. The one or more monomers to be polymerised are then added to the initial charge.

Optionally, at least some of the primary suspending agent and optionally at least some of the sulphur or phosphorous-containing polymer may be added simultaneously with the one or more monomers to be polymerised, optionally into a pre-heated reactor containing some or all of the liquid which forms the continuous phase. Optionally, one or more initiators are then charged to the reactor. Typically, the reactor inside wall, the impellor assembly and the baffle(s) (if present) may have been coated with a build-up suppressant to prevent adhesion of the poly(vinyl chloride) to the wall, the impellor assembly and the baffle(s) (if present). Optionally, at least some of the initiator may be added together with the water and one or more primary suspending agents or following the introduction of the one or more monomers to be polymerised. After or during charging the reactor contents are typically heated to a temperature of 40 to 75° C. which may cause some of the initiator to decompose.

In certain cases, the reaction is strongly exothermic reaction, in which case the temperature may be controlled by adding more continuous phase liquid (optionally with more primary and/or secondary suspending agents), or removing heat, for example by using a jacket, an internal coil or a condenser, or a combination of one or more thereof. Stirring is typically continued throughout the reaction. At a conversion of typically 80 to 95% such as 80 to 90% the reaction is terminated, typically at a predetermined pressure, usually by adding a chain terminator and/or venting off the unreacted monomer.

The method of the third aspect of the present invention may comprise forming a reaction composition in accordance with the second aspect of the present invention.

In accordance with a fourth aspect of the present invention, there is provided a polyvinyl chloride composition comprising a sulphur or phosphorous-containing polymer as defined in relation to the use of the first aspect of the present invention.

The polyvinyl chloride polymer composition may comprise the polyvinyl chloride composition as defined in relation to the use of the first aspect of the present invention. For example, the polyvinyl chloride polymer composition may comprise the polyvinyl chloride polymer as described above in relation to the use of the first aspect of the present invention.

In accordance with a fifth aspect of the present invention, there is provided a method of processing a polyvinyl chloride polymer composition, the method comprising:

providing a polyvinyl chloride polymer composition comprising a processing aid comprising a sulphur or phosphorous-containing polymer as defined in relation to the use of the first aspect of the present invention; and processing said polyvinyl chloride polymer composition.

The polyvinyl chloride polymer composition may comprise that described above in relation to the use of the first aspect of the present invention or the reaction composition of the third aspect of the present invention.

Processing said polyvinyl chloride polymer composition may comprise heating the polyvinyl chloride polymer composition, optionally to a temperature greater than the glass transition temperature and optionally to a temperature greater than the melting temperature.

Processing said polyvinyl chloride polymer composition may comprise one or more of: passing said composition through or between screw flight(s) and a barrel, rotors (including counter-rotating rotors, and rotors such as those used in high shear internal mixers, such as a Banbury mixer), rollers (calendaring), or dipping, coating or moulding said polyvinyl chloride polymer composition, for example, by extrusion, blow moulding, thermal moulding (typically either by vacuum or pressure moulding) or injection moulding. The polyvinyl chloride polymer composition will typically be heated to enable such processing to take place, typically before and/or during such processing.

Processing said polyvinyl chloride polymer composition may comprise moving said polyvinyl chloride polymer composition, optionally using a conveyor, optionally using an auger conveyor.

In accordance with a sixth aspect of the present invention, there is provided a processing aid for a polyvinyl chloride polymer composition, the processing aid comprising a sulphur or phosphorous-containing polymer as defined in relation to the use of the first aspect of the present invention.

In accordance with a seventh aspect of the present invention, there is provided a sulphur or phosphorous-containing polymer as defined in relation to the use of the first aspect of the present invention.

It will of course be appreciated that features described in relation to one aspect of the present invention may be incorporated into other aspects of the present invention.

DESCRIPTION OF THE DRAWINGS

Embodiments of the present invention will now be described by way of example only with reference to the accompanying the FIGURE which shows torque vs time measurements for several examples of polymers in accordance with the present invention and for several comparative examples, obtained using a torque rheometer.

DETAILED DESCRIPTION

The following material have been used without any purification

TABLE 1 materials

| Product | Name | Mw [g/mol] | Purity [%] | CAS N° |
|---|---|---|---|---|
| AMPS | 2-acrylamido-2-methylpropane sulfonic acid sodium salt | 229.23 | 50 | 5165-97-9 |
| BA | Butyl acrylate | 128.17 | ≥99 | 141-32-2 |
| EA | Ethyl acrylate | 100.12 | ≥99 | 104-88-5 |
| $H_2O_2$ | Hydrogen peroxide | 34.00 | 35 | 7722-84-1 |
| MMA | Methyl methacrylate | 100.12 | ≥99 | 80-62-6 |
| NaMPSA | 2-Methyl-2-propene-1-sulfonic acid sodium | 158.1 | ≥98 | 1561-92-8 |
| NaPS | Sodium persulfate | 238.10 | ≥98 | 7775-27-1 |
| NDM | N-dodecyl mercaptan | 202.40 | ≥98 | 112-55-0 |
| SB | Sodium Bicarbonate | 84.00 | ≥99 | 144-55-8 |
| SC | Sodium citrate | 214.10 | ≥99 | 18996-35-5 |
| SDBS | Sodium Dodecyl Benzene Sulfonate | 348.50 | ≥99 | 25155-30-0 |
| SDHS | Sodium dihexyl sulfosuccinate | 388.45 | ~80 | 2373-38-8 |
| SDS | Sodium dodecyl sulfate | 288.40 | ≥98 | 151-21-3 |
| SVS | Sodium vinyl sulfonate | 130.10 | 25 | 3039-83-6 |

TABLE 1-continued materials

| Product | Name | Mw [g/mol] | Purity [%] | CAS N° |
|---|---|---|---|---|
| tBHP | tert-Butyl hydroperoxide | 90.12 | 35 | 75-91-2 |
| VAc | Vinyl Acetate | 86.10 | ≥99 | 108-05-4 |
| VCM | Vinyl Chloride | 62.50 | ≥99 | 75-01-4 |

The synthesis of various examples of processing aids in accordance with the present invention will now be described.

Processing Aid A 390 kg of distilled water, 5.4 kg of sodium bicarbonate, 5.4 kg of sodium citrate were introduced into the reactor and temperature was set at 80° C. Once the temperature was reached, 3.64 kg of NaPS was introduced under agitation. 26 kg of VAc mixed with 0.26 kg of NDM were added over ~1 hour. At the end of the addition, 494 kg of VAc mixed with 4.94 kg of NDM were added over ~4 hours, at the same time 20.8 kg of AMPS in 14.56 kg of distilled water was added over ~4 hours and 1.56 kg of NaPS in 33.8 kg of distilled water was added over ~4 hours 15 minutes. Upon completion of the additions of NaPS solution, the reaction was further cooked for 1 hour at 85° C. The batch was then cooled and at 75° C. and at 65° C., 0.193 kg of tBHP was charged and 10 minutes later, 0.169 kg of Ascorbic acid solubilised in 1.352 kg of distilled water was fed over 10 minutes. At 30° C., 0.13 kg of antifoam and 0.446 kg of $H_2O_2$ were added.

Processing Aid B 225 g of distilled water, 0.2 g of sodium bicarbonate, 0.2 g of sodium citrate were introduced into the reactor and temperature was set at 80° C. Once the temperature was reached, 0.55 g of NaPS was introduced under agitation. 7.5 g of BA mixed with 7.5 g of MMA were added over 30 minutes. At the end of the addition, 67.5 g of BA with 67.5 g of MMA were added over ~2 hours, at the same time 2.6 g of NaMPSA in 25 g of distilled water was added over ~2 hours and 0.2 g of NaPS in 25 g of distilled water was added over ~2 hours. Upon completion of the additions of NaPS solution, the reaction was further cooked for 1 hour at 80° C. and 1 hour at 85° C.

Processing Aid C 780 g of distilled water, 10.8 g of sodium bicarbonate, 10.8 g of sodium citrate were introduced into the reactor and temperature was set at 80° C. Once the temperature was reached, 7.28 g of NaPS was introduced under agitation. 26 g of MMA, 26 g of BA, 0.52 g of NDM and 2.08 g of AMPS were mixed and added over ~1 hour. At the end of the addition, 494 g of MMA, 494 g of BA mixed with 9.88 g of NDM were added over ~4 hours, at the same time 39.52 g of AMPS in 29.12 g of distilled water was added over ~4 hours and 3.12 g of NaPS in 67.8 g of distilled water was added over ~4 hours 15 minutes. Upon completion of the additions of NaPS solution, the reaction was further cooked for 1 hour at 85° C. The batch was then cooled and at 75° C. and at 65° C., 0.38 g of tBHP was charged and 10 minutes later, 0.34 of Ascorbic acid solubilised in 2.7 g of distilled water was fed over 10 minutes. At 30° C., 0.26 g of antifoam and 0.89 g of $H_2O_2$ were added Processing Aid D 390 g of distilled water, 5.4 g of sodium bicarbonate, 5.4 g of sodium citrate were introduced into the reactor and temperature was set at 80° C. Once the temperature was reached, 3.64 g of NaPS was introduced under agitation. 23.4 g of MMA, mixed with 1.04 g of AMPS were mixed and added over 30 minutes. At the end of the addition, 444.6 g of MMA, 52 g of BA mixed with 5.18 g of NDM were added over ~3 hours, at the same time 19.76 g of AMPS in 14.56 g of distilled water was added over ~3 hours and 1.56 g of NaPS in 33.9 g of distilled water was added over ~3 hours 15 minutes. Upon completion of the additions of NaPS solution, the reaction was further cooked for 1 hour at 85° C. The batch was then cooled and at 75° C. and at 65° C., 0.38 g of tBHP was charged and 10 minutes later, 0.34 g of Ascorbic acid solubilised in 2.7 g of distilled water was fed over 10 minutes. At 30° C., 0.26 g of antifoam and 0.89 g of $H_2O_2$ were added.

Processing Aid E

The process for producing processing aid E is identical to that used for Processing aid C, except that BA was replaced by EA.

The process for producing processing aid E is identical to that used for Processing aid D, except that BA was replaced by EA.

Processing aids A-B were synthesised by making a "seed" of polymer which does not comprise the sulphur-containing species. Processing aids C-F were synthesised by making a "seed" of polymer which comprised the sulphur-containing species. The processing aids A-F were characterised, and the results are shown in Table 2.

TABLE 2

Characterisation results for the processing aids

| Processing aid | Monomer mixture | TSC [%] | $M_n$ [g/mol] | $M_w$ [g/mol] | Particle size (nm) |
|---|---|---|---|---|---|
| A | VAc | 55.0 | 3,400 | 107,500 | 165 |
| B | MMA:BA (50:50) | 35.9 | 55,80 | 545,600 | NA |
| C | MMA:BA (50:50) | 54.4 | 28,000 | 163,600 | 378 |
| D | MMA:BA (90:10) | 54.3 | 41,000 | 178,600 | 500 |
| E | MMA:EA (50:50) | 53.3 | 36,200 | 207,300 | 359 |
| F | MMA:EA (90:10) | 54.1 | 42,000 | 270,000 | 392 |

The percentage total solids content (TSC) was determined by weighing a sample of material before and after drying under an IR lamp for 2 hours.

$$TSC(\%) = \left(\frac{W3 - W1}{W2 - W1}\right) \times 100$$

Where W1=Weight of sample container
W2=Weight of container plus sample before drying
W3=Weight of container plus sample after drying The molecular weights, $M_w$ and $M_n$, were measured by size exclusion chromatography (SEC) (also known as gel permeation chromatography, GPC) in THF solution. The sample was injected into a PL-GPC-50 system via autosampler, using stabilised THF as a mobile phase and three PL gel columns in series, each column having dimensions of 300 mm×7.5 mm×10 µm. The system was calibrated with polystyrene standards in the Mp molecular weight range of 6,035,000-580 gmol$^{-1}$.

Particle size was measured by light transmission using a LUMiSizer 6512-12. Measurements were carried out at 25° C., at 4000 rpm rotor speed and a wavelength of 470 nm. 500 profiles at 30 s intervals were measured to obtained final particle size. Before the measurements, the samples were diluted with deionized water.

Processing aids A, C and D were further characterised using differential scanning calorimetry (DSC) to determine whether the measured $T_g$ is consistent with that predicted using the Fox equation and therefore whether the composition of the respective processing aid is consistent with the theoretical composition based on the amount of monomer used. Good agreement between the theoretical and measured values of $T_g$ was observed for each of the processing aids A, C and D, indicating that the composition of each of the processing aids is consistent with the theoretical composition.

Several processing aids were synthesised by making a "seed" of polymer which comprised a different monomer(s) to the delayed monomer (feed) component.

Processing Aid G 390 g of distilled water, 5.4 g of sodium bicarbonate, 5.4 g of sodium citrate were introduced into the reactor and temperature was set at 80° C. Once the temperature was reached, 3.64 g of NaPS was introduced under agitation. 26 g of MMA, 26 g of BA, 0.52 g of NDM and 2.08 g of AMPS were mixed and were added over ~1 hour. At the end of the addition, 468 g of VAc mixed with 4.7 g of NDM were added over ~4 hours, at the same time 18.72 g of AMPS in 15.18 g of distilled water was added over ~4 hours and 1.56 g of NaPS in 33.9 g of distilled water was added over ~4 hours 15 minutes. Upon completion of the additions of NaPS solution, the reaction was further cooked for 1 hour at 85° C. The batch was then cooled and at 75° C. and at 65° C., 0.193 g of tBHP was charged and 10 minutes later, 0.169 g of Ascorbic acid solubilised in 1.352 g of distilled water was fed over 10 minutes. At 30° C., 0.13 g of antifoam and 0.446 g of H$_2$O$_2$ were added.

Processing Aid H 390 g of distilled water, 5.4 g of sodium bicarbonate, 5.4 g of sodium citrate were introduced into the reactor and temperature was set at 80° C. Once the temperature was reached, 3.64 g of NaPS was introduced under agitation. 13 g of MMA, 13 g of BA, 0.52 g of NDM and 2.08 g of AMPS were mixed and were added over ~1 hour. At the end of the addition, 494 g of VAc mixed with 4.7 g of NDM were added over ~4 hours, at the same time 18.72 g of AMPS in 15.18 g of distilled water was added over ~4 hours and 1.56 g of NaPS in 33.9 g of distilled water was added over ~4 hours 15 minutes. Upon completion of the additions of NaPS solution, the reaction was further cooked for 1 hour at 85° C. The batch was then cooled and at 75° C. and at 65° C., 0.193 g of tBHP was charged and 10 minutes later, 0.169 g of Ascorbic acid solubilised in 1.352 g of distilled water was fed over 10 minutes. At 30° C., 0.13 g of antifoam and 0.446 g of H$_2$O$_2$ were added Processing Aid I 390 g of distilled water, 5.4 g of sodium bicarbonate, 5.4 g of sodium citrate were introduced into the reactor and temperature was set at 80° C. Once the temperature was reached, 3.64 g of NaPS was introduced under agitation. 26 g of MMA, 26 g of BA, 0.52 g of NDM and 3.12 g of AMPS were mixed and were added over ~1 hour. At the end of the addition, 468 g of VAc mixed with 4.7 g of NDM were added over ~4 hours, at the same time 28.08 g of AMPS in 15.18 g of distilled water was added over ~4 hours and 1.56 g of NaPS in 33.9 g of distilled water was added over ~4 hours 15 minutes. Upon completion of the additions of NaPS solution, the reaction was further cooked for 1 hour at 85° C. The batch was then cooled and at 75° C. and at 65° C., 0.193 g of tBHP was charged and 10 minutes later, 0.169 g of Ascorbic acid solubilised in 1.352 g of distilled water was fed over 10 minutes. At 30° C., 0.13 g of antifoam and 0.446 g of H$_2$O$_2$ were added.

The processing aids G-I were characterised, and the results are shown in Table 3.

TABLE 3

Characterisation results for the processing aids

| Processing aid | Seed composition | Feed composition | Seed:Feed [%, w/w] | TSC [%] | $M_n$ [g/mol] | $M_w$ [g/mol] | Particle size (nm) |
|---|---|---|---|---|---|---|---|
| G | MMA:BA 50:50 | VAc | 10:90 | 52.6 | 23,500 | 6,130,000 | 760 |
| H | MMA:BA 50:50 | VAc | 5:95 | 53.4 | 26,000 | 1,084,000 | 340 |
| I | MMA:BA 50:50 | VAc | 10:90 | 52.2 | 32,000 | 2,200,500 | 670 |

The processing aids mentioned above were used as secondary suspending agents in the suspension polymerisation of vinyl chloride as will now be described to produce examples of polyvinyl chloride polymer in accordance with embodiments of the present invention.

Reactions were carried out in a PVC Pilot Plant 1 litre Buchi® stainless steel reactor, using the following general conditions:

Temperature: 57° C.
Stirrer speed: 750 rpm
Stirrer type: Standard (as supplied)

TABLE 4 conditions for synthesis of polyvinyl chloride

| | |
|---|---|
| Demineralised water | 350 g |
| Vinyl chloride monomer | 189 g |
| Di(4-tert-butylcyclohexyl) peroxydicarbonate (initiator) | 1,000 ppm (w/w) solids on vinyl chloride |

TABLE 4-continued conditions for synthesis of polyvinyl chloride

| | |
|---|---|
| Primary suspending agent, 4% (w/w) aqueous solution; Selected from one or more of: Alcotex ® B72 (supplied by Synthomer (UK) Ltd.) Alcotex ® 72.5 (supplied by Synthomer (UK) Ltd.) Alcotex ® 80 (supplied by Synthomer (UK) Ltd.) Hydroxypropyl methyl cellulose F50 ® supplied by The Dow Chemical Company | 1,000 ppm (w/w) solids on vinyl chloride |
| Secondary suspending agent/processing aid | variable ppm (w/w) solids on vinyl chloride |
| Sodium bicarbonate (1% (w/w) solution in demineralised water) | 800 ppm (w/w) solids on vinyl chloride |

Demineralised water, primary and secondary suspending agents, buffer and initiator were all charged to a 1 litre Büchi® stainless steel reactor (which had been previously coated with Alcotex® 225 Build-up suppressant supplied by Synthomer (UK) Ltd.) and assembled onto the rig. The recipes were designed to give a final grain size that was consistent with a typical commercial product. The reactor was then pressure tested, degassed to atmospheric and then vinyl chloride monomer charged via a volumetric bomb under nitrogen pressure. A suspension of vinyl chloride was prepared by stirring at 750 rpm. The reactor was then heated to the desired polymerisation temperature of 57° C. within 6 minutes, and at 750 rpm, this was maintained until the maximum pressure was recorded, and the reaction stopped after a pressure drop of 0.2 Mpa (by cooling and degassing to atmospheric pressure). The reactor was then subjected to a vacuum of approximately 50 KPa for 45 minutes. The reactor contents were then decanted in to a filter funnel and washed twice with 1% (w/w) sodium lauryl sulfate solution (as an anti-static treatment). The sample was then placed in a circulating fan oven at 50° C. for 12 hours to dry.

The resulting PVC samples were analysed for grain size ($D_{50}$), grain size distribution (GSD), cold plasticiser absorption (CPA), bulk density (BD) and packing factor (PF), and the results are shown below.

Various examples of polyvinyl chloride polymer were synthesised using the method described above, but using different amounts of processing aid A. Alcotex® B72 at 1000 ppm was used as the Primary suspending agent. The results are shown below in Table 5.

TABLE 5

PVC results obtained with processing aid A at various addition levels (ppm)

| Example No. | Processing aid | Charged [ppm*] | $D_{50}$ [μm] | GSD | CPA [%] | BD [g/L] | PF |
|---|---|---|---|---|---|---|---|
| 1 | A | 300 | 137 | 0.25 | 29.8 | 512 | 51.8 |
| 2 | A | 400 | 135 | 0.24 | 29.2 | 509 | 51.2 |
| 3 | A | 500 | 130 | 0.20 | 32.2 | 495 | 51.2 |
| 4 | A | 600 | 142 | 0.26 | 26.4 | 542 | 53.0 |
| 5 | A | 700 | 112 | 0.28 | 17.8 | 555 | 49.6 |
| 6 | A | 800 | 124 | 0.20 | 32.2 | 497 | 1.5 |
| 7 | A | 900 | 120 | 0.25 | 31.4 | 503 | 51.7 |
| 8 | A | 1000 | 126 | 0.19 | 28.6 | 531 | 53.1 |
| 9 | A | 1100 | 121 | 0.24 | 29.2 | 513 | 51.7 |
| 10 | A | 1200 | 149 | 0.27 | 26.4 | 499 | 48.8 |
| 11 | A | 1400 | 122 | 0.23 | 29.2 | 600 | 51.3 |
| 12 | A | 1600 | 224 | 0.34 | 29.2 | 554 | 55.7 |
| 13 | A | 1800 | 166 | 0.24 | 29.2 | 537 | 54.0 |
| 14 | A | 2000 | 137 | 0.26 | 29.8 | 487 | 49.3 |
| 15 | A | 10,000 | BM | ND | 37.0 | ND | ND |

*= based upon mass of dry processing aid polymer relative to mass of VCM charged
BM = bimodal distribution
ND = Not determined $D_{50}$, a measure of grain size (typically given in microns), was determined thus. 12.5 g of polymer is weighed and placed on a stack of sieves having openings of 315, 250, 200, 160, 100 and 75 microns respectively, and a collecting pan for collecting anything that passes through the 75 micron sieve. The stack is secured to a vibrator and shaken for 15 minutes. The mass of polymer in each sieve is recorded and each value divided by 12.5 to give a measure of the fraction of the total mass caught by that sieve. The values are plotted on a logarithmic graph and the value at which 50% of the mass is reached is determined.

GSD, grain size distribution, was determined by using the graph obtained for the $D_{50}$ grain size measurement to determine the grain size at which 16% of the mass of the polymer is reached, and the grain size at which 84% of the mass of the polymer is reached. The GSD is then calculated by halving the difference between the grain size at which 84% of the mass is reached and the grain size at which 16% of the mass is reached and dividing that result by $D_{50}$.

BD, bulk density, was determined thus. A quantity of polymer is placed in a fluid bed dryer and dried at 50° C. for an hour. The polymer is cooled for an hour. The polymer is then poured through a funnel into a stainless steel container of precisely 100 cm³, conforming to ASTM 1895B. A sharp blade is used to level the polymer mound, and the container weighed. The BD (bulk density) may be calculated from the mass and volume of the polymer in the container.

CPA, cold plasticiser absorption, was determined by carefully weighing 2.5 g of the polymer and 4 g and dioctyl phthalate (a plasticiser) into a vessel containing a membrane. The vessel is jacketed and centrifuged at 3000 rpm for an hour (to give same value as the ASTM standard). The vessel is reweighed to determine the mass of plasticiser that has been adsorbed by the polymer. A percentage figure relative to the mass of the polymer can be calculated.

PF, the packing fraction, is a measure of how well the grains of polymer pack together. It is calculated thus:

$$PF = \frac{(1 + 0.014 \; CPA)(0.1 \; BD)}{1.4}$$

Various examples of polyvinyl chloride polymer were synthesised using the method described above, but using processing aids B, C, D, G and H at 500 ppm. Alcotex® B72 at 1000 ppm was used as the Primary suspending agent. The results are shown below in Table 6.

TABLE 6

PVC results obtained with different processing aids

| Example No. | Sample No. | $D_{50}$ [μm] | GSD | CPA [%] | BD [g/L] | PF |
|---|---|---|---|---|---|---|
| 16 | B | 141 | 0.25 | 29.2 | 503 | 50.6 |
| 17 | C | 250 | 0.59 | 25.6 | 497 | 48.2 |
| 18 | D | 240 | 0.31 | 29.9 | 507 | 51.3 |
| 19 | G | 150 | 0.28 | 31.8 | 471 | 48.6 |
| 20 | H | 125 | 0.20 | 32.5 | 476 | 49.5 |

Various examples of polyvinyl chloride polymer were synthesised using the method described above, using processing aid A at 1000 ppm, and various primary suspending agents at various concentrations. The results are shown below in Table 7.

TABLE 7

PVC results obtained using various primary suspending agents at different addition levels

| Example No. | Primary suspending agent Type | [ppm] | Other modification | Fine PVC [g] | $D_{50}$ [μm] | GSD | CPA [%] | Coarse PVC [g] |
|---|---|---|---|---|---|---|---|---|
| 21 | B72 | 800 | NA | 36 | 137 | NA | 35.8 | 33 |
| 22 | B72 | 1000 | NA | 30 | NA | NA | 37.0 | 55 |
| 23 | A72.5 | 750 | NA | 65 | 109 | 0.84 | 33.0 | 42 |
| 24 | A72.5 | 800 | NA | 50 | 137 | 0.74 | 35 | 3 |
| 25 | A72.5 | 1000 | NA | 40 | 141 | NA | NA | 50 |
| 26 | A72.5 | 800 | 250 ppm of A80 | 25 | 226 | NA | 33.6 | 57 |
| 27 | A80 | 800 | NA | 60 | 148 | NA | 30.8 | 77 |
| 28 | A80 | 1000 | NA | 69 | 103 | 0.65 | 27.0 | 55 |
| 29 | A80 | 1200 | NA | 22 | 154 | 0.52 | 26.8 | 14 |
| 30 | A80 | 1000 | 100 ppm of F50 | 27 | 313 | NA | 24.6 | 67 |

The amount of coarse and fine PVC was determined thus. The PVC was sieved using a sieve with a sieve hole size of 315 microns. PVC passing through the sieve was deemed to be fine PVC. The PVC not passing through the sieve was deemed to be coarse PVC. Typical PVC data for control samples made using Alcotex® B72 alone, and in combination with Alcotex® 552P (a conventional low hydrolysis polyvinyl alcohol secondary suspending agent) are given in Table 8.

TABLE 8

PVC of control samples

| Example No. | Alcotex® B72 [ppm] | Alcotex® 552P [ppm] | $D_{50}$ [μm] | GSD | CPA [%] | BD [g/L] | PF |
|---|---|---|---|---|---|---|---|
| C. Ex. 1 | 1300 | 0 | 125 | 0.25 | 18.7 | 516 | 46.5 |
| C. Ex. 2 | 1000 | 500 | 130 | 0.38 | 29.0 | 511 | 51.8 |

It can be seen from Table 8 that the incorporation of a secondary suspending agent increases the porosity (CPA) of the PVC polymer, comparison of this data with that shown in Tables 5, 6 and 7 indicates that the processing aids of this invention also raise the CPA values of the resultant PVC polymer; without wishing to be bound by theory, this is indicative of the processing aids of the present invention acting as a secondary suspending agent.

Various examples of polyvinyl chloride polymer were synthesised using the method described above, using processing aid A at 1000 ppm, but varying the VCM:water ratio and using different agitator speeds. The results are shown below in Table 9.

TABLE 9

PVC results obtained with processing aid A at different ratios of VCM: water and different agitator speeds

| Example No. | Primary suspending agent Type | [ppm] | Other modification | Fine PVC [g] | $D_{50}$ [μm] | GSD | CPA [%] | Coarse PVC [g] |
|---|---|---|---|---|---|---|---|---|
| 31 | B72 | 1300 | 420 ml H$_2$O 750 rpm | ND | ND | ND | ND | 38 |
| 32 | A80 | 800 | 420 ml H$_2$O 600 rpm | 62 | 266 | ND | 27.4 | 19 |

ND—not determined

The melting properties of some of the example polyvinyl chloride polymers mentioned above were studied using a torque rheometer.

A number of additional PVC polymerisation runs were required in order to provide sufficient sample size for the torque rheometer experiments, the results are shown in Table 10:

TABLE 10

PVC for blend components used in the fusion - time tests

| Example No. | Processing aid | $D_{50}$ [μm] | GSD | CPA [%] | BD [g/L] | PF |
|---|---|---|---|---|---|---|
| 33 | A | 137 | 0.26 | 29.6 | 520 | 52.6 |
| 17 | C | 250 | 0.59 | 25.6 | 497 | 48.2 |
| 34 | C | 223 | 0.34 | 32.0 | 484 | 50.0 |
| 35 | C | 204 | 0.40 | 39.6 | 503 | 57.0 |
| 18 | D | 240 | 0.31 | 29.9 | 507 | 51.4 |
| 36 | D | 171 | 0.24 | 25.9 | 498 | 48.5 |
| 37 | D | 151 | 0.53 | 33.1 | 506 | 52.9 |

Note, Example 33 was a repeat of Ex. 3, but prepared on a 10 litre scale PVC reactor The blends used in the rheometer are described in Table 11 below.

The following PVC polymers were used for the fusion-time tests:

TABLE 11

Details for the PVC examples used in the fusion - time experiments

| Example No. | Composition |
|---|---|
| C. Ex. 1 | Blend of PVC samples made using Alcotex ® B72 only |
| C. Ex. 2 | Blend of PVC samples made using Alcotex ® B72 + Alcotex ® 552P |
| 38 | Blend of Ex. 17, 34, 35 |
| 39 | Blend of Ex. 18, 36, 37 |
| 33 | Ex. 33 |
| C. Ex. 3 | C. Ex. 4 + Paraloid ® K120N (1.2phr) |
| C. Ex. 4 | Blend of PVC samples made without processing aid |
| C. Ex. 5 | C. Ex. 4 + Paraloid ® K120N (5.7phr) |

Torque vs time curves were measured for each respective polyvinyl chloride polymer. The so-called fusion-time tests were carried out in a ThermoFisher PolySoft OS Mixer®, with a bowl volume of 390 ml and an ideal fill ratio of 75%, using the following composition:

| | |
|---|---|
| Polyvinyl chloride polymer | 350 g |
| Zinc Stearate | 2.1 g |
| Calcium Stearate | 3.5 g |
| Paraffin Wax (Antilux ® 654) | 3.5 g |
| Polyethylene wax (PE Wax PEG 1500) | 0.5 g |
| Titanium dioxide | 5.3 g |
| Calcium carbonate | 10.5 g |

The test samples were prepared by weighing out the relevant amounts and charging into the mixer in the order of PVC powder first addition, additives second addition. The weight was then lowered into the mixer and the recorder started. The following parameters were used: bowl temperature 120° C., speed of mixer 120 rpm, brush down at 7 minutes, initial run time 10 minutes.

The data were analysed for fusion time, fusion temperature, maximum torque and pre-melt torque.

At the end of the mix cycle the product was removed from the mixer and examined for appearance, the core melt temperature was checked and a sample was passed through a two roll lab mill to obtain a "sheet". Core melt temperature was obtained by placing a temperature probe into the melt immediately after its removal from the chamber, a number of determinations per sample being made.

The colour and porosity (bubble structure) of a cross-section of the PVC were studied in samples obtained from the ThermoFisher PolySoft OS Mixer®:

Two comparative examples were prepared according to the above formulation but additionally incorporating Paraloid® K120N at 4.2 g (1.2 phr) and 20 g (5.7 phr) respectively. Paraloid® K120N is a conventional processing aid obtainable from Dow Chemical Company.

Table 12 shows the observed torque values prior to melt/fusion occurring for examples of polyvinyl chloride polymer compositions in accordance with the present invention, and some comparative examples. The time was defined as elapsed time from the initial torque maximum as the ram/hammer is dropped in to seal the bowl.

TABLE 12

Torque - time data for various PVC compositions

| Sample Reference | Torque (mN) | |
|---|---|---|
| | 90 seconds | 120 seconds |
| C. Ex. 1 | 107.5 | 107.5 |
| C. Ex. 2 | 97.4 | 148.5 |
| 38 | 92.5 | 148.0 |
| 39 | 100.0 | 98.2 |
| 33 | 75.6 | 75.2 |
| C. Ex. 3 | 98.4 | 98.4 |
| C. Ex. 4 | 94.5 | 93.2 |
| C. Ex. 5 | 278.3 | 207.1 |

"C. Ex." indicates comparative example.

Table 12 shows that the PVC made with the processing aids of this invention give similar, or much reduced torque values compared to C. Ex. 2.

It is believed that extending the time elapsed between charging the PVC composition and it undergoing gelation is beneficial to the distribution of the polymer additives, especially the stabilisers.

Table 13 shows various melt characteristics of examples of polyvinyl chloride polymer compositions in accordance with the present invention, and some comparative examples.

TABLE 13 melt characteristics for several examples of polyvinyl chloride polymer compositions in accordance with the present invention and several comparative examples

| Sample Reference | Start Fusion Temperature (° C.) | End Fusion Temperature (° C.) | Core melt temperature (° C.) | Fusion Time (s) | Maximum Fusion Torque (Nm) | colour | Pore structure |
|---|---|---|---|---|---|---|---|
| C. Ex. 1 | 162 | 186 | 190-199 | 214 | 192.5 | yellow/pink slight olive green hue in centre | medium number of medium pores |
| C. Ex. 2 | 162 | 188 | 190-199 | 295 | 182.5 | yellow/pink | medium number of small pores |
| Ex. 38 | 163 | 188 | 180 | 375 | 160.0 | part pale yellow/pink part olive green | Large number of medium pores |
| Ex. 39 | 164 | 188 | 190-199 | 325 | 172.5 | pale yellow/pink | medium number of medium pores |

TABLE 13-continued melt characteristics for several examples of polyvinyl chloride polymer compositions in accordance with the present invention and several comparative examples

| Sample Reference | Start Fusion Temperature (° C.) | End Fusion Temperature (° C.) | Core melt temperature (° C.) | Fusion Time (s) | Maximum Fusion Torque (Nm) | colour | Pore structure |
|---|---|---|---|---|---|---|---|
| Ex. 33 | 160 | 180 | 190-199 | 372 | 192.5 | White/pink | medium number of small pores |
| C. Ex. 3 | 160 | 190 | 190-199 | 219 | 220.0 | olive green | Large number of large pores |
| C. Ex. 4 | 162 | 188 | 190-199 | 261 | 186.3 | yellow/pink slight olive green hue in centre | medium number of medium pores |
| C. Ex. 5 | 156 | 186 | >200 | 66 | 287.5 | | medium number of medium pores |

"C. Ex." indicates comparative example.

The sample description in Table 11 indicates the presence of the various suspending agents used in the preparation of the PVC polymer that has been tested.

Torque vs. time curves are shown in FIG. 1 for all of the polymer compositions listed in Table 13 bar C. Ex. 4. It can be seen from data of Tables 12 and 13, and FIG. 1 that the presence of the processing aid has a dramatic effect upon the processing and fusion properties of the PVC.

FIG. 1 demonstrates that the presence of the processing aid is beneficial to at least some of the melt processing properties of the polyvinyl polymer composition. It can be seen in FIG. 1 that the pre-melt torque values of Examples 38 and 39 are lower than that for the PVC made using a conventional secondary suspending agent [C. Ex. 2]. Furthermore, the pre-melt torque value of Example A is comparable to that of C. Ex. 2, but Example 33 shows a lower maximum torque than C. Ex. 2.

The polyvinyl chloride polymer compositions made using processing aids 33, 38 and 39 all show significantly lower pre-melt torques and lower maximum torques than polymers C. Ex. 6 and 8 which use a conventional processing aid.

The PVC made with the vinyl acetate-based processing aid had a colour which was much paler than either C. Ex. 1 or C. Ex. 2. The PVC made with the (meth)acrylate based processing aid gave a PVC with a surface colour similar to C. Ex. 1 and C. Ex. 2, but the centre of the melt had a green hue.

It was observed that the PVC samples produced using processing aids 33, 38 or 39 gave excellent 'grab' characteristics in a 2-roll mill. For the avoidance of doubt, the description 'grab characteristics' refers to the ease with which a sample can be introduced into the nip of a laboratory 2-roll mill, and to be fed through the mill. Such a mill can be used for milling and calendering.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The examples above use a processing aid which is synthesised using emulsion polymerisation, in particular, emulsion polymerisation in which a "seed" of polymer is formed before the addition of the majority of the monomer. Those skilled in the art will realise that such a seed need not be formed.

The examples above use a processing aid which is synthesised using emulsion polymerisation. Other techniques, such as suspension or solution polymerisation may be used to synthesise the processing aid.

The examples above use suspension polymerisation to synthesise the polyvinyl chloride polymer. Other techniques, such as emulsion, bulk or solution polymerisation, may be used to synthesise the polyvinyl chloride polymer.

The examples above demonstrate the use of particular polymers as processing aids. Those skilled in the art will realise that alternative polymers may be used, for example, polymers comprising phosphorus groups.

In view of the present disclosure, it may be anticipated by those skilled in the state of the art that the incorporation of the processing aids of this invention may have a beneficial effect when conventional processing aids are blended into said PVC.

In view of the present disclosure, it may be anticipated by those skilled in the state of the art that the incorporation of the processing aids of this invention or other processing aids could be added by the method of this invention which would improve for example, but not exclusively, plasticisation, impact modification, heat deflection and flexural strength of the PVC.

The examples above demonstrate the use of particular polymers not only as melt additives, but as secondary stabilising agents. Those skilled in the art will realise that this need not be the case; the polymers may optionally not act as a stabilising agent.

The examples above show how the exemplified polymers provide good porosity values for the PVC-based polymer. Those skilled in the art will realise that this need not be the case.

The examples above demonstrate that the polymer used as a processing aid provides a PVC-based polymer with fewer bubbles during melting, good melt torque properties and good pre-melt torque properties. Those skilled in the art will realise that the polymer used as a processing aid may provide one or more, or indeed none, of those properties. One or more other benefits as a processing aid may be provided.

The examples above demonstrate the use of the polymer as a processing aid in relation to one particular type of PVC. Those skilled in the art will realise that the polymer may be used as a processing aid in relation to different PVC-based polymers.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A sulphur or phosphorous-containing polymer used in a polyvinyl chloride polymer composition, the sulphur or phosphorous-containing polymer-comprising:
   (i) residues of at least one ester-containing monomer, the ester-containing monomer(s) comprising one polymerisable carbon-carbon double bond per monomer and an ester group, and
   (ii) one or more residues of:
      (a) at least one monomer comprising a sulfonate, sulfonic acid, sulfonic ester, sulfonamide or sulfonyl halide group (or a salt or ester thereof), the monomer(s) comprising a sulfonate, sulfonic acid, sulfonic ester group, sulfonamide or sulfonyl halide group (or a salt or ester thereof) comprising one polymerisable carbon-carbon double bond per monomer and a sulfonate, sulfonic acid, sulfonic ester, sulfonamide or sulfonyl halide group (or a salt or ester thereof), or
      (b) at least one monomer of:

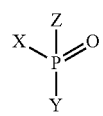

Formula (1)

where P is phosphorous, O is oxygen, at least one of X, Y and Z comprises at least one (and optionally only one) polymerisable carbon-carbon double bond, and at least one of X, Y and Z comprises OH, or a salt or ester thereof;
the sulphur or phosphorous-containing polymer optionally being partially hydrolysed such that a proportion of said ester groups form alcohol groups, the degree of hydrolysis of the polymer being from 0 to 60 mol %;
wherein said sulphur or phosphorous-containing polymer is made by emulsion polymerisation, and is added to a suspension polymerisation reaction mixture comprising vinyl chloride, which is reacted to form the polyvinyl chloride polymer; and
wherein said sulphur or phosphorous-containing polymer comprises a seed.

2. The polymer of claim 1, wherein the polyvinyl chloride polymer composition comprises a polyvinyl chloride polymer and one or more additives.

3. The polymer of claim 1, wherein the sulphur or phosphorous-containing polymer is further used as a porosity control additive.

4. The polymer of claim 1, wherein the sulphur or phosphorous-containing polymer is further used as a secondary suspending agent.

5. The polymer of claim 1, wherein the polyvinyl chloride polymer is synthesised by suspension, solution, bulk or emulsion polymerisation.

6. The polymer of claim 1, wherein said sulphur or phosphorous-containing polymer is substantially unhydrolysed.

7. The polymer of claim 1, wherein the sulphur or phosphorous-containing polymer comprise residues of more than one ester-containing monomer.

8. The polymer of claim 7, wherein the sulphur or phosphorous-containing polymer comprises residues of vinyl acetate and methyl (meth)acrylate, or vinyl acetate and dimethyl maleate, or methyl (meth)acrylate and butyl acrylate, or methyl (meth)acrylate and ethyl (meth)acrylate.

9. The polymer of claim 7, wherein the sulphur or phosphorous-containing polymer comprises residues of vinyl acetate, methyl methacrylate and butyl acrylate.

10. The polymer of claim 1, wherein the sulphur or phosphorous-containing polymer comprises residues of substantially only one ester-containing monomer.

11. The polymer of claim 10, wherein the ester-containing monomer is an alkenyl alkanoate.

12. The polymer of claim 10, wherein the ester-containing monomer is an alkyl acrylate or alkyl methacrylate.

13. The polymer of claim 1, wherein the sulphur or phosphorous-containing polymer comprise up to 10 mol % of the residues of monomers (a) or (b), based on the residue content of the one or more ester-containing monomers.

14. The polymer of claim 1, wherein said sulphur or phosphorous-containing polymer comprises at least 98% by weight of residues of monomers (i) and (ii).

15. The polymer of claim 1, wherein said sulphur or phosphorous-containing polymer comprises residues of monomer (b), wherein the monomer of Formula (1) comprises a phosphonate, phosphonic acid, phosphonic ester, phosphonamide or phosphonyl halide group (or salts or esters thereof) and at least one polymerisable carbon-carbon double bond per monomer.

16. The polymer of claim 1, wherein the number average molecular weight, $M_n$, of the sulphur or phosphorous-containing polymer is from 3,000 to 45,000 gmol$^{-1}$.

17. The polymer of claim 1, wherein the weight average molecular weight, $M_w$, of the sulphur or phosphorous-containing polymer is from 100,000 to 550,000 gmol$^{-1}$.

18. The polymer of claim 1, wherein the amount of said sulphur or phosphorous containing polymer is at least 100 ppm and no more than 10,000 ppm, based on the mass of the monomers used to synthesise the polyvinyl chloride.

19. A suspension polymerisation reaction composition for synthesising a polyvinyl chloride polymer comprising;
   a continuous phase in which is dispersed droplets of one or more monomers to be polymerised;
   one or more primary suspending agents;
   a sulphur or phosphorous-containing polymer comprising:
   (i) residues of at least one ester-containing monomer, the ester-containing monomer(s) comprising one polymerisable carbon-carbon double bond per monomer and an ester group, and
   (ii) one or more residues of:
      (a) at least one monomer comprising a sulfonate, sulfonic acid, sulfonic ester, sulfonamide or sulfonyl halide group (or a salt or ester thereof), the monomer(s) comprising a sulfonate, sulfonic acid, sulfonic ester group, sulfonamide or sulfonyl halide group (or a salt or ester thereof) comprising one polymerisable carbon-carbon double bond per monomer and a sulfonate, sulfonic acid, sulfonic ester, sulfonamide or sulfonyl halide group (or a salt or ester thereof), or (b) at least one monomer of:

Formula (1)

where P is phosphorous, O is oxygen, at least one of X, Y and Z comprises at least one (and optionally only one) polymerisable carbon-carbon double bond, and at least one of X, Y and Z comprises OH, or a salt or ester thereof;

the sulphur or phosphorous-containing polymer optionally being partially hydrolysed such that a proportion of said ester groups form alcohol groups, the degree of hydrolysis of the polymer being from 0 to 60 mol %;

wherein said sulphur or phosphorous-containing polymer is made by emulsion polymerisation, and is added to the suspension polymerisation reaction mixture comprising vinyl chloride, which is reacted to form the polyvinyl chloride polymer; and wherein said sulphur or phosphorous-containing polymer comprises a seed;

the sulphur or phosphorous-containing polymer providing processing aid properties to the polyvinyl chloride polymer.

20. A method of making a polyvinyl chloride polymer using suspension polymerisation, the method comprising:

polymerising one or more monomers in the presence of a sulphur or phosphorous-containing polymer, the sulphur or phosphorous-containing polymer providing processing aid properties to the polyvinyl chloride polymer;

wherein the sulphur or phosphorous-containing polymer comprises:

(i) residues of at least one ester-containing monomer, the ester-containing monomer(s) comprising one polymerisable carbon-carbon double bond per monomer and an ester group, and (ii) one or more residues of:

(a) at least one monomer comprising a sulfonate, sulfonic acid, sulfonic ester, sulfonamide or sulfonyl halide group (or a salt or ester thereof), the monomer(s) comprising a sulfonate, sulfonic acid, sulfonic ester group, sulfonamide or sulfonyl halide group (or a salt or ester thereof) comprising one polymerisable carbon-carbon double bond per monomer and a sulfonate, sulfonic acid, sulfonic ester, sulfonamide or sulfonyl halide group (or a salt or ester thereof), or (b) at least one monomer of:

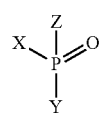

Formula (1)

where P is phosphorous, O is oxygen, at least one of X, Y and Z comprises at least one (and optionally only one) polymerisable carbon-carbon double bond, and at least one of X, Y and Z comprises —OH, or a salt or ester thereof;

the sulphur or phosphorous-containing polymer optionally being partially hydrolysed such that a proportion of said ester groups form alcohol groups, the degree of hydrolysis of the polymer being from 0 to 60 mol %;

wherein said sulphur or phosphorous-containing polymer is made by emulsion polymerisation, and is added to the suspension polymerisation reaction mixture comprising vinyl chloride, which is reacted to form the polyvinyl chloride polymer; and wherein said sulphur or phosphorous-containing polymer comprises a seed.

21. A method of processing a polyvinyl chloride polymer composition, the method comprising:

providing a polyvinyl chloride polymer composition comprising a processing aid comprising a sulphur or phosphorous-containing polymer, and processing said polyvinyl chloride polymer composition;

wherein the sulphur or phosphorous-containing polymer comprises:

(i) residues of at least one ester-containing monomer, the ester-containing monomer(s) comprising one polymerisable carbon-carbon double bond per monomer and an ester group, and (ii) one or more residues of:

(a) at least one monomer comprising a sulfonate, sulfonic acid, sulfonic ester, sulfonamide or sulfonyl halide group (or a salt or ester thereof), the monomer(s) comprising a sulfonate, sulfonic acid, sulfonic ester group, sulfonamide or sulfonyl halide group (or a salt or ester thereof) comprising one polymerisable carbon-carbon double bond per monomer and a sulfonate, sulfonic acid, sulfonic ester, sulfonamide or sulfonyl halide group (or a salt or ester thereof), or (b) at least one monomer of:

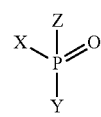

Formula (1)

where P is phosphorous, O is oxygen, at least one of X, Y and Z comprises at least one (and optionally only one) polymerisable carbon-carbon double bond, and at least one of X, Y and Z comprises —OH, or a salt or ester thereof;

the sulphur or phosphorous-containing polymer optionally being partially hydrolysed such that a proportion of said ester groups form alcohol groups, the degree of hydrolysis of the polymer being from 0 to 60 mol %;

wherein said sulphur or phosphorous-containing polymer is made by emulsion polymerisation, and is added to a suspension polymerisation reaction mixture comprising vinyl chloride, which is reacted to form the polyvinyl chloride polymer; and wherein said sulphur or phosphorous-containing polymer comprises a seed.

22. A method according to claim 21, wherein processing said polyvinyl chloride polymer composition comprise heating the polyvinyl chloride polymer composition.

23. A method according to claim 21, wherein processing said polyvinyl chloride polymer composition comprises one or more of: passing said composition through or between screw flight(s) and a barrel, rotors (including counter-rotating rotors), rollers (calendering), or dipping, coating or moulding said polyvinyl chloride polymer composition.

24. The reaction of claim 19, wherein the sulphur or phosphorous-containing polymer further comprises one or more secondary suspending agents.

25. The polymer of claim 1, wherein the sulphur or phosphorous-containing polymer is used as a processing aid in the polyvinyl chloride polymer composition.

* * * * *